United States Patent
Cha et al.

(10) Patent No.: US 8,878,995 B2
(45) Date of Patent: Nov. 4, 2014

(54) DISPLAY DRIVER, OPERATING METHOD THEREOF, HOST FOR CONTROLLING THE DISPLAY DRIVER, AND SYSTEM HAVING THE DISPLAY DRIVER AND THE HOST

(75) Inventors: Chi Ho Cha, Hwaseong-si (KR); Sang Kyu Lee, Suwon-si (KR); Hyun-Chul Lee, Seoul (KR); Jong Seon Kim, Seongnam-si (KR); Hyo Jin Kim, Hwaseong-si (KR); Hak-Seong Lee, Hwaseong-si (KR); Seung Jin In, Yongin-si (KR); Hyon Jun Choi, Hwaseong-si (KR)

(73) Assignee: Samsung Electronics Co., Ltd, Gyeonggi-Do (KR)

( * ) Notice: Subject to any disclaimer, the term of this patent is extended or adjusted under 35 U.S.C. 154(b) by 0 days.

(21) Appl. No.: 13/601,678

(22) Filed: Aug. 31, 2012

(65) Prior Publication Data
US 2013/0057763 A1  Mar. 7, 2013

(30) Foreign Application Priority Data

Sep. 2, 2011 (KR) .................. 10-2011-0089009
Oct. 4, 2011 (KR) .................. 10-2011-0100727

(51) Int. Cl.
| H04N 5/46 | (2006.01) |
| H04N 3/27 | (2006.01) |
| G09G 5/12 | (2006.01) |
| G09G 5/36 | (2006.01) |
| G09G 5/18 | (2006.01) |
| G09G 5/00 | (2006.01) |

(52) U.S. Cl.
CPC ............ *G09G 5/006* (2013.01); *G09G 2330/12* (2013.01); *G09G 5/12* (2013.01); *G09G 2330/021* (2013.01); *G09G 5/36* (2013.01); *G09G 2370/04* (2013.01); *G09G 5/18* (2013.01); *G09G 2360/10* (2013.01); *G09G 2370/10* (2013.01); *G09G 2360/18* (2013.01); *G09G 2320/103* (2013.01)
USPC ........... 348/554; 348/553; 348/705; 348/739; 348/706; 348/719; 345/204; 345/533

(58) Field of Classification Search
USPC ......... 348/554, 555, 553, 705, 706, 719, 739; 345/214, 204, 533, 534
See application file for complete search history.

(56) References Cited

U.S. PATENT DOCUMENTS 6,335,728 B1 * 1/2002 Kida et al. .................. 345/204
7,030,871 B2   4/2006 Kitagawa et al.
(Continued)

FOREIGN PATENT DOCUMENTS

JP   2004326091 A   11/2004
KR  20040102918 A   12/2004
(Continued)

*Primary Examiner* — Jefferey Harold
*Assistant Examiner* — Jean W Desir
(74) *Attorney, Agent, or Firm* — Harness, Dickey & Pierce, P.L.C.

(57) ABSTRACT

An operation method of a display driver includes generating a count value by counting a period of a synchronization signal related to a synchronization packet received from a host, receiving a mode change command from the host, the mode change command indicating a change from a video mode transmitting first image data to a display by bypassing a frame memory to a command mode transmitting second image data to the display through the frame memory, and generating an internal synchronization signal having a period substantially equal to the period of the synchronization signal by using the count value based on the mode change command after a last pulse of the synchronization signal is generated. A time interval between the last pulse and a first pulse of the internal synchronization signal is equal to the period of the synchronization signal.

21 Claims, 30 Drawing Sheets

(56) References Cited

U.S. PATENT DOCUMENTS

| | | |
|---|---|---|
| 7,145,541 B2 | 12/2006 | Kurokawa et al. |
| 2004/0207620 A1 | 10/2004 | Ra |
| 2010/0156928 A1 | 6/2010 | Lee et al. |

FOREIGN PATENT DOCUMENTS

| | | |
|---|---|---|
| KR | 100687253 B1 | 2/2007 |
| KR | 100943715 | 2/2010 |
| KR | 20100074759 A | 7/2010 |

\* cited by examiner

DISPLAY DRIVER, OPERATING METHOD THEREOF, HOST FOR CONTROLLING THE DISPLAY DRIVER, AND SYSTEM HAVING THE DISPLAY DRIVER AND THE HOST

CROSS-REFERENCE TO RELATED APPLICATIONS

This application claims priority under 35 U.S.C. §119(a) to Korean Patent Application Nos. 10-2011-0089009 filed on Sep. 2, 2011 and 10-2011-0100727 filed on Oct. 4, 2011, the entire contents of which are hereby incorporated by reference.

BACKGROUND

At least one example embodiment of inventive concepts relate to a display driver, which may perform mode change between a video mode and a command mode based on a mode change command during an operation, an operation method thereof, a host which may control the display driver, and/or a system having the display driver and the host. At least one example embodiment of inventive concepts may also relate to a display driver switching between an interface processing a still image signal and an interface processing a moving image signal according to a type of an input image signal, an operation method of the display driver, and/or an image signal processing system including the same.

Data traffic between a mobile application processor and a display driver integrated circuit (IC) is becoming dramatically increased in response to improvements in image resolution. As a result, power consumed at the mobile application processor and/or the display driver IC is steadily increasing.

Conventional voice-centric cellular phones are being swiftly replaced with multimedia data-centric smart phones. Display driver ICs included in smart phones operate frequently to display multimedia data, such as a still image signal or a moving image signal, on a display.

As a result, a smart phone's battery life, the time for which the battery may be used with one charge, decreases. Accordingly, devices and methods that may increase the battery life of a mobile communication device are desired.

SUMMARY

An example embodiment of inventive concepts is directed to an operation method of a display driver, including generating a count value by counting a period of a synchronization signal related to a synchronization packet received from a host, receiving a mode change command from the host, the mode change command signal indicating a change from a video mode transmitting first image data to a display by bypassing a frame memory to a command mode transmitting second image data to the display through the frame memory, and generating an internal synchronization signal having a period substantially equal to the period of the synchronization signal by using the count value based on the mode change command after a last pulse of the synchronization signal is generated. A time interval between the last pulse and a first pulse of the internal synchronization signal is equal to the period of the synchronization signal.

According to an example embodiment, an operation method of the display driver further includes writing the first image data in the frame memory as well as bypassing the first image data to the display during at least a frame after receiving the mode change command. According to another example embodiment, an operation of the display driver further includes writing the first image data in the frame memory as well as bypassing the first image data to the display during the time interval.

According to an example embodiment, a frame rate of the first image data is greater than a frame rate of the second image data. In addition, according to another example embodiment, the operation of the display driver further includes calculating a difference between the period of the synchronization signal and the period of the internal synchronization signal, and adjusting a generation timing of a tearing effect control signal by using the difference and transmitting the tearing effect control signal to the host.

An example embodiment of inventive concepts is directed to an operation method of a host controlling an operation of a display driver, including receiving a tearing effect control signal and error information from the display driver and adjusting a generation timing of a synchronization packet related to a synchronization signal to be restored in the display driver by using the tearing effect control signal and the error information.

According to an example embodiment, the error information corresponds to difference between a period of the synchronization signal and a period of an internal synchronization signal which is generated in the display driver, the internal synchronization signal based on the synchronization signal.

Another example embodiment of the inventive concepts is directed to an operation method of a host controlling an operation of a display driver, including receiving error information from the display driver, transmitting a control value for controlling a generation timing of a tearing effect control signal to the display driver based on the error information, receiving the generation timing-controlled tearing effect control signal based on the control value from the display driver, and generating a synchronization packet related to a synchronization signal to be restored in the display driver according to the controlled tearing effect control signal.

According to an example embodiment, the error information corresponds to a difference between a period of the synchronization signal and a period of an internal synchronization signal generated in the display driver, the internal synchronization signal based on the synchronization signal.

According to an example embodiment, an image processing system includes a display driver and a host configured to control an operation of the display driver, the display driver configured to generate a count value by counting a period of a synchronization signal related to a synchronization packet transmitted from the host, receives a first mode change command, which indicates a change from a video mode transmitting first image data to a display by bypassing a frame memory to a command mode transmitting second image data to the display through the frame memory from the host, and generate an internal synchronization signal having a period substantially equal to the period of the synchronization signal by using the count value after a last pulse of the synchronization signal is generated. A time interval between the last pulse and a first pulse of the internal synchronization signal is equal to the period, and the host does not transmit a new synchronization packet to the display driver after the video mode is changed into the command mode.

According to an example embodiment, the display driver is configured to write the first image data in the frame memory as soon as bypassing the first image data to the display during at least a frame after receiving the mode change command.

According to example embodiments, the display driver is configured to calculate a difference between the period of the synchronization signal and the period of the internal synchronization signal, adjusts a generation timing of a tearing effect control signal by using the difference after receiving a second mode change command, which indicates a change from the command mode to the video mode, from the host, transmits the tearing effect control signal to the host. The host is configured to generate a new synchronization packet according to the tearing effect control signal.

According to an example embodiment, the display driver is configured to adjust the generation timing of the tearing effect control signal such that a time interval between a first pulse of a synchronization signal, which is restored in the display driver according to the new synchronization packet, and a last pulse of the internal synchronization signal may be equal to the period of the internal synchronization signal.

According to an example embodiment, an image processing system includes a display driver and a host configured to control an operation of the display driver, the display driver configured to transmit a tearing effect control signal and error information to the host according to a mode change command, which indicates a change from a command mode transmitting first image data to a display through a frame memory to a video mode transmitting second image data to the display by bypassing the frame memory. The host is configured to adjust a generation timing of a synchronization packet related to a synchronization signal which will be restored in the display driver based on the tearing effect control signal and the error information.

According to an example embodiment, the host is configured to adjust the generation timing of the synchronization packet such that a time interval between a last pulse of an internal synchronization signal generated in the display during the command mode and a first pulse of the synchronization signal may be equal to a period of the internal synchronization signal.

According to an example embodiment, a frame rate of the first image data is less than a frame rate of the second image data.

An image processing system according to still another example embodiment of inventive concepts includes a display driver and a host configured to control an operation of the display driver, the display driver configured to transmit error information to the host according to a mode change command, which indicates a change from a command mode transmitting first image data to a display by using a frame memory to a video mode transmitting second image data to the display by bypassing the frame memory. The host is configured to transmit a control value for controlling a generation timing of a tearing effect control signal to the display driver according to the error information, receives a tearing effect control signal generated according to the control value from the display driver, and generates a synchronization packet related to a synchronization signal which will be restored in the display driver according to a received tearing effect control signal.

According to an example embodiment, the host is configured to adjust the generation timing of the synchronization packet such that a time interval between a last pulse of an internal synchronization signal generated in the display during the command mode and a first pulse of the synchronization signal may be equal to a period of the internal synchronization signal.

According to an example embodiment, a display driver comprises: a receiver configured to receive an image signal including a mode change command indicating whether the image signal to be displayed on a display is a still image signal or a moving image signal; a control circuit configured to generate first control signals and second control signals in response to the mode change command transmitted from the receiver; a first interface configured to output the still image signal from the receiver using a memory in response to the first control signals; and a second interface configured to output the moving image signal from the receiver without using the memory in response to the second control signals.

According to an example embodiment, the first interface comprises: a first switching circuit configured to control transmission of the still image signal in response to the first control signals; and a selection circuit configured to transmit the still image signal received from the first switching circuit or the moving image signal received from the second interface to the memory in response to a selection signal generated by the control circuit based on the mode change command.

According to an example embodiment, the second interface comprises a second switching circuit configured to output the moving image signal transmitted from the receiver to at least one of the selection circuit and an output port of the second interface in response to the second control signals.

According to an example embodiment, the second switching circuit is configured to simultaneously output the moving image signal transmitted from the receiver to the selection circuit and the output port of the second interface for a desired period of time in response to the second control signals.

According to an example embodiment, the first interface is an interface supporting mobile industry processor interface (MIPI®) command mode or a central processing unit (CPU) interface, and the second interface is an interface supporting MIPI® video mode or an RGB interface.

According to an example embodiment, the mode change command is embedded in a vertical blanking interval included in the still image signal or the moving image signal.

According to an example embodiment, a first selection circuit configured to output the still image signal output from the memory or the moving image signal output from the second interface in response to a first selection signal; and an output circuit configured to transmit an image signal output from the first selection circuit to the display, the control circuit configured to generate the first selection signal in response to the mode change command.

According to an example embodiment, the first interface includes: a first switching circuit configured to transmit the still image signal to the memory in response to the first control signals; a scan switching circuit configured to transmit the still image signal from the memory to the first selection circuit in response to a scan switching signal; and the second interface includes a second switching circuit configured to transmit the moving image signal to the first selection circuit in response to the second control signals.

According to an example embodiment, the first interface includes a first switching circuit configured to transmit the still image signal in response to the first control signals, a second selection circuit configured to output the still image signal received from the first switching circuit or the moving image signal received from the second interface to the memory in response to a second selection signal, a scan switching circuit configured to transmit the still image signal from the memory to the first selection circuit in response to a scan switching signal; and the second interface includes a second switching circuit configured to transmit the moving image signal to at least one of the first selection circuit and the second selection circuit in response to the second control signals, the control circuit configured to generate the second selection signal and the scan switching signal in response to the mode change command.

According to an example embodiment, the scan switching circuit is in an on state in response to the scan switching signal while the second switching circuit transmits the moving image signal to the second selection circuit in response to the second control signals, and the scan switching circuit is in an off state in response to the scan switching signal while the second switching circuit transmits the moving image signal to the first selection circuit in response to the second control signals.

According to an example embodiment, if the second switching circuit transmits the moving image signal to both of the first and second selection circuits simultaneously in response to the second control signals, the scan switching circuit is turned off in response to the scan switching signal.

According to an example embodiment, a portable communication device comprises: a display; a display driver configured to transmit an image signal to the display; and a host configured to transmit the image signal including a mode change command, which indicates whether the image signal to be displayed on the display is a still image signal or a moving image signal, to the display driver, the display driver including, a control circuit configured to generate first control signals and second control signals in response to the mode change command; a first interface configured to transmit the still image signal to the display using a memory in response to the first control signals; and a second interface configured to transmit the moving image signal to the display without using the memory in response to the second control signals.

According to an example embodiment, the display driver further comprises: a first selection circuit configured to output the image signal output from an output port of the first interface or an output port of the second interface in response to a first selection signal; and an output circuit configured to transmit the image signal output from the first selection circuit to the display, the first interface including, a first switching circuit configured to transmit the still image signal in response to the first control signals; a second selection circuit configured to output the still image signal received from the first switching circuit or the moving image signal received from the second interface to the memory in response to a second selection signal; and a scan switching circuit configured to transmit the still image signal from the memory to the first selection circuit in response to a scan switching signal, the second interface including, a second switching circuit configured to transmit the moving image signal to at least one circuit among the first selection circuit and the second selection circuit in response to the second control signals, the control circuit configured to generate the first selection signal, the second selection signal, and the scan switching signal in response to the mode change command.

According to an example embodiment, if the moving image signal is transmitted following the still image signal or if the still image signal is transmitted following the moving image signal, the output circuit is disabled for a period corresponding to at least one frame according to the control of a timing controller.

According to an example embodiment, the host is configured to determine whether the image signal is the still image signal or the moving image signal based on operation or non-operation of a codec and generate the mode change command according to a determination result.

According to an example embodiment, the host is configured to monitor a tearing effect control signal received from the display driver and transmit the mode change command to the display driver in a vertical blanking interval according to a monitoring result.

According to an example embodiment, the host is configured to transmit the mode change command, which indicates that the moving image signal is transmitted following the still image signal, to the display driver in a vertical blanking interval and then immediately transmit the moving image signal to the display driver.

According to an example embodiment, the host is configured to transmit the mode change command, which indicates that the still image signal is transmitted following the moving image signal, to the display driver in a vertical blanking interval and then transmit a first still image frame of the still image signal to the display driver before a first falling edge of a tearing effect control signal.

According to an example embodiment, the vertical blanking interval is a vertical back porch.

According to an example embodiment, the second interface is configured to transmit the moving image signal to both of the display and the memory, simultaneously, in response to the second control signals, and the first interface is configured to transmit the moving image signal from the memory to the display driver in response to a switching signal output from the control circuit.

According to an example embodiment, an operation method of a display driver comprises: generating control signals in response to a mode change command, which indicates whether an image signal to be displayed on a display is a still image signal or a moving image signal; and switching between a command mode, in which the still image signal is transmitted to the display via a memory, and a video mode, in which the moving image signal is transmitted to the display without using the memory, in response to the control signals.

According to an example embodiment, the mode change command is embedded in a vertical blanking interval of the still image signal or the moving image signal.

According to an example embodiment, an operation method of a display driver includes transmitting the image signal to the display during at least one frame of the image signal if switching is performed between the video mode and the command mode.

According to an example embodiment, an operation method of an application host processor comprises: monitoring a tearing effect control signal output from a display driver; and transmitting a mode change command, which indicates whether an image signal to be transmitted to the display driver is a still image signal or a moving image signal, in a vertical blanking interval of the image signal according to a monitoring result.

According to an example embodiment, the method further comprises: transmitting the moving image signal to the display driver immediately after transmitting the mode change command.

According to an example embodiment, the mode change command is transmitted in a vertical front porch or a vertical back porch of the vertical blanking interval.

According to an example embodiment, the method further comprises: transmitting a first still image frame of the still image signal before a falling edge of the tearing effect control signal after transmitting the mode change command.

According to an example embodiment, a method for operating a display driver comprises: generating a control signal based on a period of a synchronization signal and a period of an internal synchronization signal, the control signal including error information; sending the control signal to a host; and receiving a packet from the host, a transmission timing of the packet being based on the control signal.

According to an example embodiment, the error information includes a difference between the period of the synchronization signal and the period of internal synchronization signal.

According to an example embodiment, the generating includes generating the internal synchronization signal using a count value, the count value determined by counting a period of a synchronization packet received from the host processor.

According to an example embodiment, the generating includes generating the control signal based on a period of a synchronization signal, a period of an internal synchronization signal, and a control value received from a host, the control value indicating error information previously received by the host.

According to an example embodiment, the method further comprises: processing the packet received from the host to generate a restored image signal and the synchronization signal; and transmitting the restored image signal and at least one of the synchronization signal and the internal synchronization signal to a display.

According to an example embodiment, transmitting the restored image signal includes transmitting the restored image signal through a frame memory if the restored image signal is a still image signal, and transmitting the internal synchronization signal to the display.

According to an example embodiment, transmitting the restored image signal includes the restored image signal bypassing a frame memory if the restored image signal is a moving image signal, and transmitting the synchronization signal to the display.

BRIEF DESCRIPTION OF THE DRAWINGS

The above and other features and advantages of example embodiments will become more apparent in view of the following description and with reference to the attached drawings in which.

DETAILED DESCRIPTION

Figure 1:
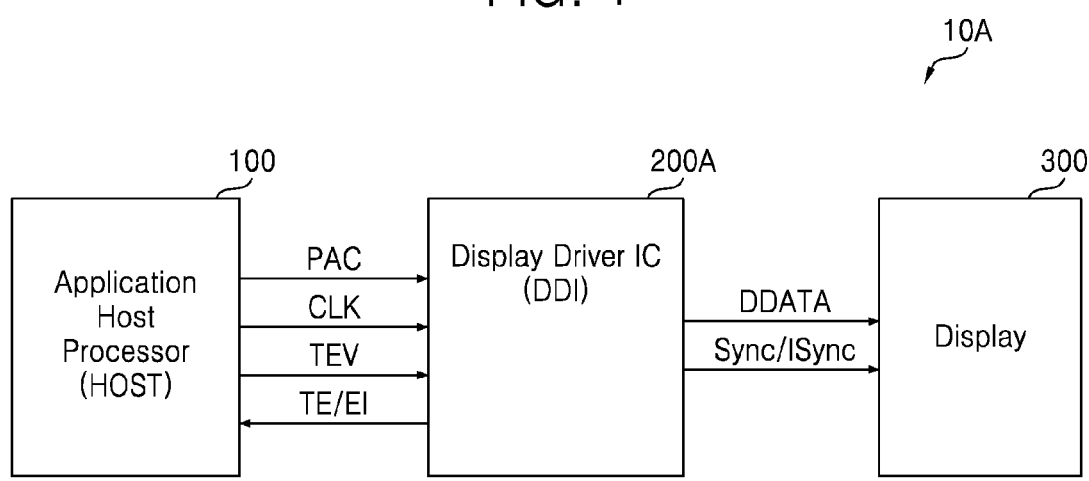
FIG. 1 is a block diagram of an image signal processing system according to an example embodiment of inventive concepts.

Example embodiments now will be described more fully hereinafter with reference to the accompanying drawings, in which example embodiments are shown. Example embodiments may, however, be embodied in many different forms and should not be construed as limited to the embodiments set forth herein. Rather, these example embodiments are provided so that this disclosure will be thorough and complete, and will fully convey the scope of example embodiments to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
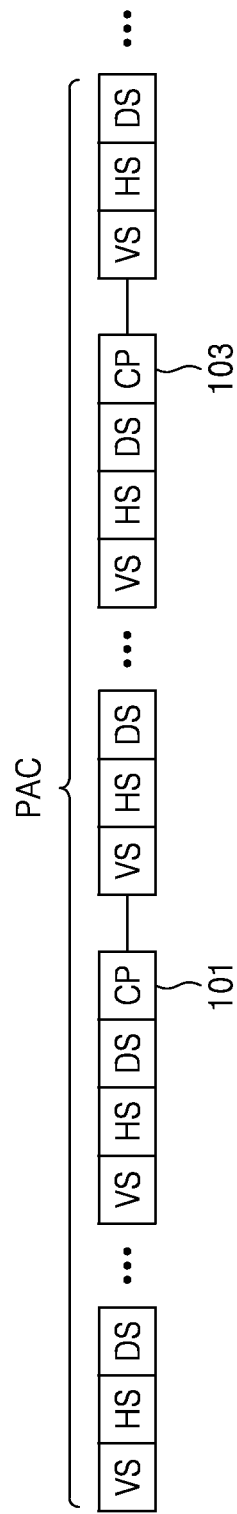
FIG. 2 is an example embodiment of a packet transmitted from a host to a display driver.

FIG. 1 is a block diagram of an image signal processing system according to an example embodiment of inventive concepts, and FIG. 2 is an example embodiment of a packet transmitted from a host to a display driver.

Referring to FIG. 1, the image signal processing system 10A may be a mobile device which may display a still image signal (or a still image) or a moving image signal (or a moving image) on a display 300, e.g., a mobile phone, a smart phone, a tablet personal computer (PC), a personal digital assistant (PDA) or a portable multimedia player (PMP), a handheld device or a handheld computer, etc.

The image signal processing system 10A includes an application host processor 100 (hereinafter, it is called 'a host'), a display driver (or a display driver IC "DDI") 200A and a display 300.

According to example embodiments, the host 100 may transmit a packet PAC to the display driver 200A based on whether or not codec embodied in the host 100 is performed. The packet PAC may include a command packet CP including a mode change command indicating whether an image signal to be displayed on the display 300 is a still image signal or a moving image signal.

According to example embodiments, the host 100 may transmit a packet PAC to the display driver 200A according to a frame rate of image data to be displayed on the display 300. The packet PAC may include a command packet CP including a mode change command indicating whether to transmit the image data to the display 300 by bypassing a frame memory or by through the frame memory.

For example, when a frame rate of the image data is less than 30 fps (frames per second), the image data may be transmitted to the display 300 through a frame memory or the image data may be transmitted to the display 300 by bypassing the frame memory.

Referring to FIGS. 1 and 2, a packet PAC transmitted from the host 100 to the display driver 200A based on a clock signal CLK may include a vertical synchronization packet VS, a horizontal synchronization packet HS, a data stream packet DS and a command packet CP. In FIG. 2, a packet shown as a combination of bits.

The vertical synchronization packet VS includes information related to a vertical synchronization signal necessary for displaying an image signal or image data, and a horizontal synchronization packet HS includes information related to a horizontal synchronization signal necessary for displaying the image signal. Accordingly, the display driver 200A may restore a vertical synchronization signal from the vertical synchronization packet VS and restore a horizontal synchronization signal from the horizontal synchronization packet HS. A clock signal CLK may be used in the restoration.

The data stream packet DS includes an image signal to be displayed on the display 300, and the command packet CP includes a command related to an operation of the display driver 200A and/or an operation of the display 300. For example, the command packet CP may include a mode change (switch) command.

The host 100 may receive a tearing effect (TE) control signal TE output from the display driver 200A and control generation timing or transmission timing of a packet PAC based on a received TE control signal TE. Restoration timing of a vertical synchronization signal and/or a horizontal synchronization signal may be controlled according to generation timing or transmission timing of the packet PAC. The TE control signal TE may be a control signal for mitigating (or alternatively, preventing) screen tearing.

For example, generation timing of a vertical synchronization signal Vsync may be determined based on generation timing of a TE control signal TE. In addition, generation timing of the TE control signal may be controlled by the display driver 200 based on a control value TEV set by the host 100. That is, a vertical synchronization signal Vsync and/or a horizontal synchronization signal Hsync may be controlled based on the control value TEV and generation timing of the TE control signal TE.

According to example embodiments, the host 100 may control generation timing or transmission timing of the packet PAC by using the TE control signal TE and error information EI. According to example embodiment, the host 100 may adjust a control value TEV by using the error information EI.

The display driver 200A may process or restore a data stream packet DS included in a packet PAC output from the host 100 and determine whether to transmit processed or restored data DDATA to the display 300 through a frame memory or by bypassing the frame memory. This determination may be made in response to a mode change command included in a command packet CP of the packet PAC output from the host 100.

According to FIG. 1, the display driver 200A in a video mode VM may transmit a synchronization signal Sync along with data DDATA whose frame memory is bypassed to the display 300. Additionally, the display driver 200A in a command mode CM may transmit data DDATA output through the frame memory along with an internal synchronization signal ISync to the display 300.

The display 300 may display an output image signal DDATA output from the display driver 200A by using a synchronization signal Sync or an internal synchronization signal ISync. For example, the display 300 may be a Liquid crystal display (LCD), a light emitting diode (LED) display, an Organic LED (OLED) display or an active-matrix OLED (AMOLED) display, etc.

Figure 3:
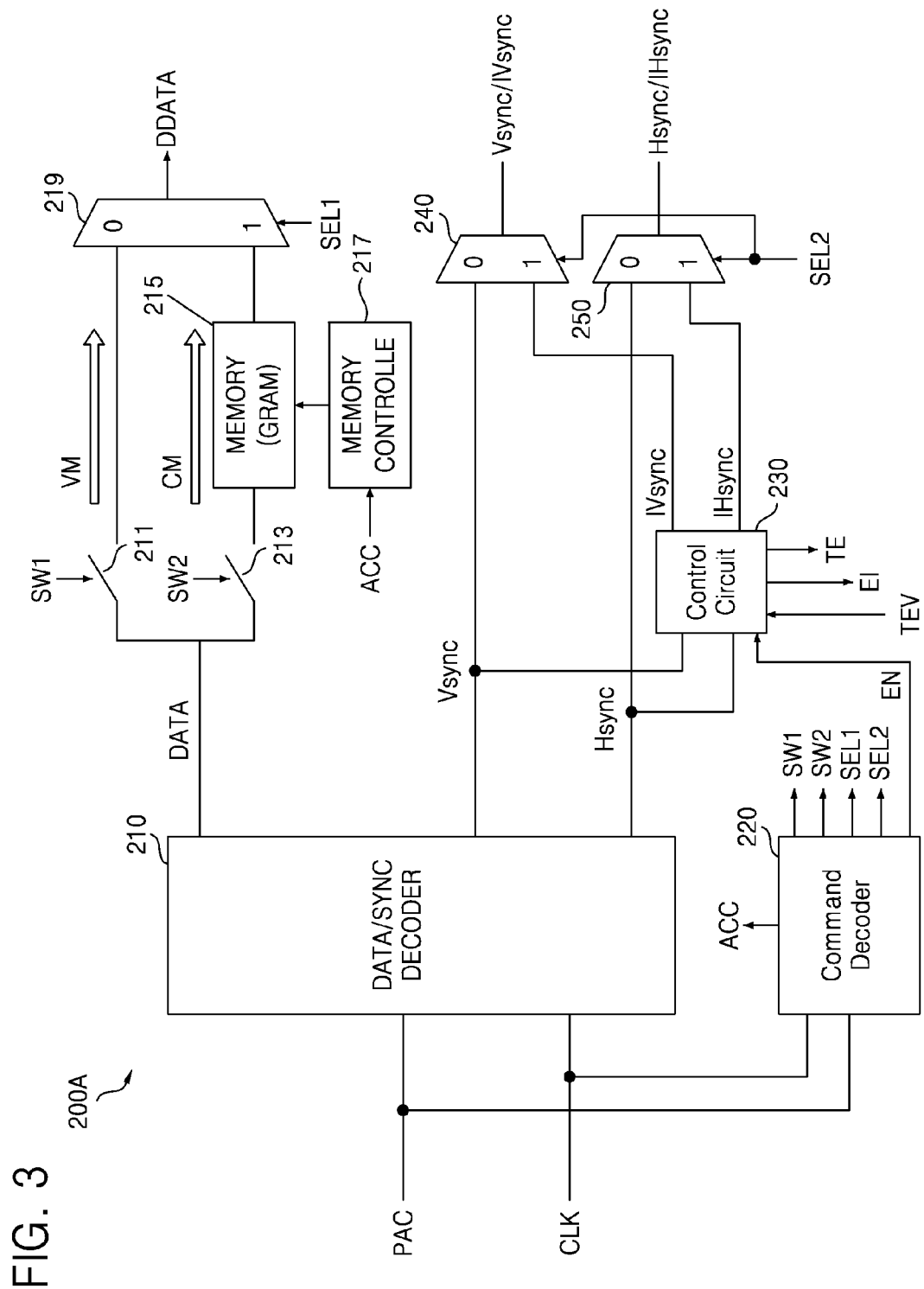
FIG. 3 is an example embodiment of a block diagram of the display driver illustrated in FIG. 1.
Figure 4:
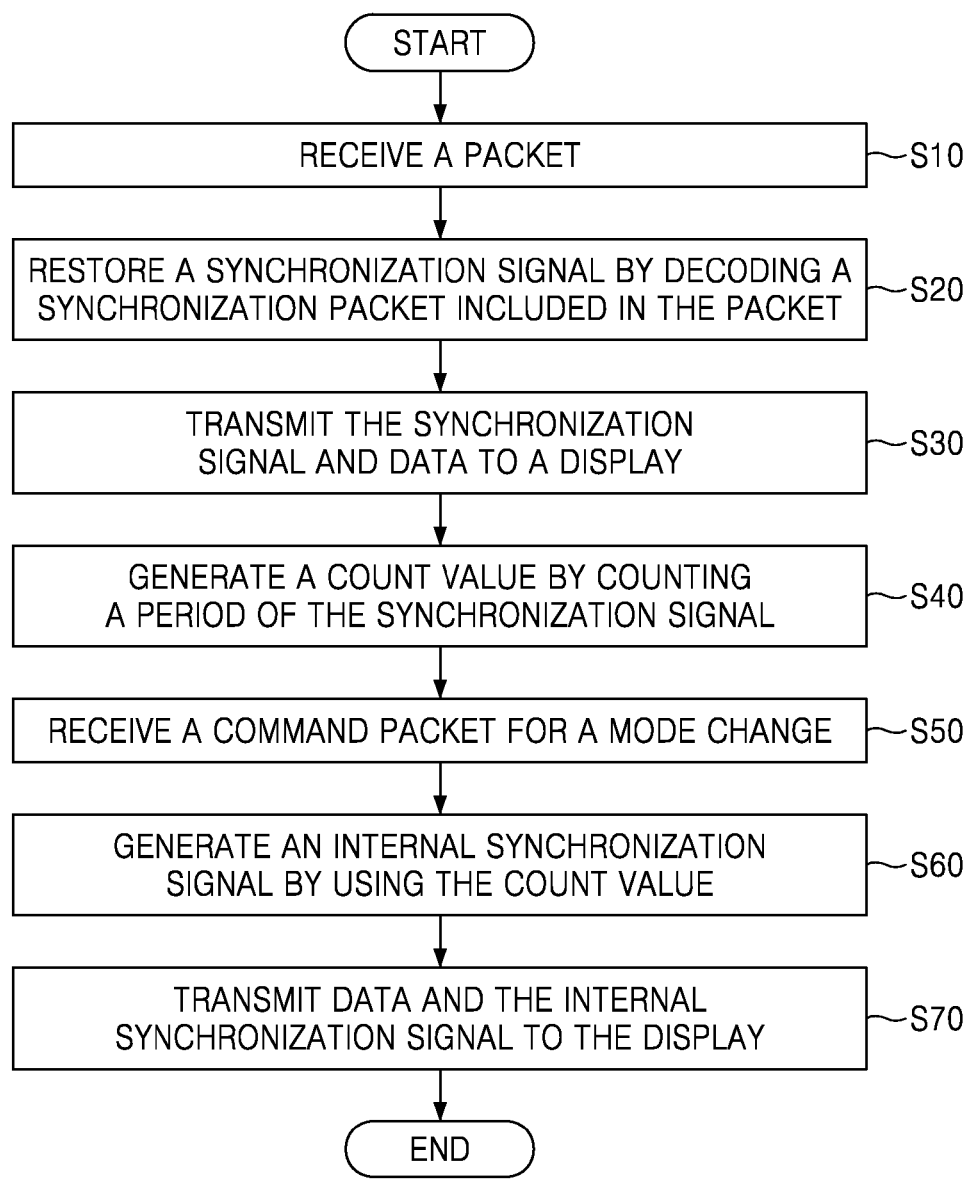
FIG. 4 is a flowchart explaining an operation of the display driver illustrated in FIG. 3.
Figure 5:
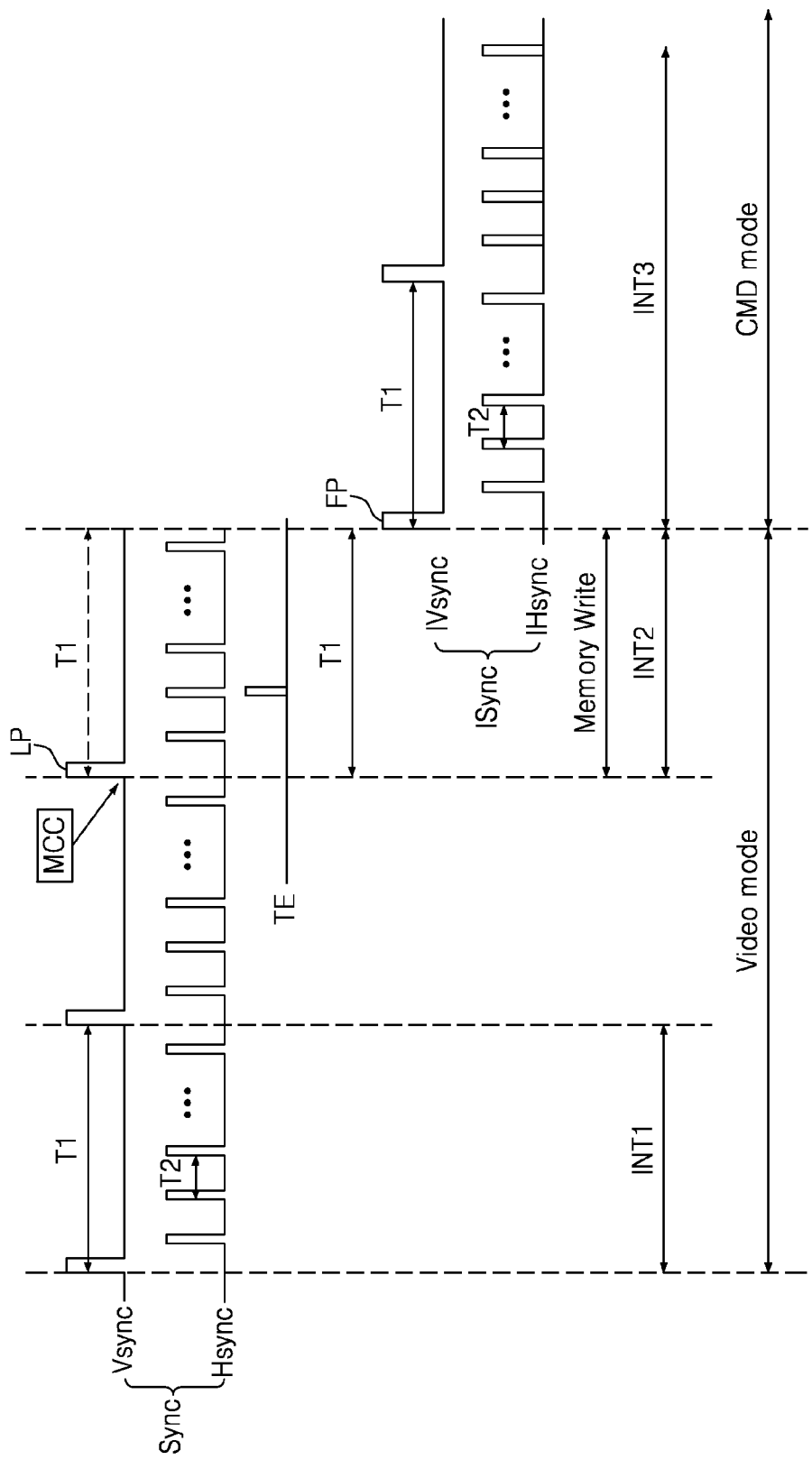
FIG. 5 is a timing diagram explaining an operation of the display driver illustrated in FIG. 3.

FIG. 3 is an example embodiment of a block diagram of the display driver illustrated in FIG. 1. FIG. 4 is a flowchart for explaining an operation of the display driver illustrated in FIG. 3. FIG. 5 is a timing diagram for explaining an operation of the display driver illustrated in FIG. 3.

Referring to FIGS. 1 to 3, the display driver 200A includes a data/synchronization decoder 210, a first switch circuit 211, a second switch circuit 213, a frame memory 215, a frame memory controller 217, a first selection circuit 219, a command decoder 220, a control circuit 230, a second selection circuit 240 and a third selection circuit 250.

In response to a clock signal CLK, the data/synchronization decoder 210 restores an image signal DATA from a data stream packet DS included in a packet PAC, restores a vertical synchronization signal Vsync from a vertical synchronization packet VS, and restores a horizontal synchronization signal Hsync from a horizontal synchronization packet HS. According to an example embodiment, the data/synchronization decoder 210 may be included in a deserializer.

The first switch circuit 211 transmits a restored image signal DATA to a first selection circuit 219 in response to a first switching signal SW1.

The second switch circuit 213 transmits a restored image signal DATA to a frame memory 215 in response to a second switching signal SW2. According to an example embodiment, each switch circuit 211 and 213 may include at least one switch in a NMOS transistor. According to another example embodiment, each switch circuit 211 and 213 may perform a function of a bus controller.

For example, the first switch circuit 211 may be an interface supporting a MIPI® video mode which processes a moving image signal, but not through a frame memory 215 or a RGB interface.

The second switch circuit 213 may be an interface supporting a MIPI® command mode which uses the frame memory 215 to process a still image signal. The interface may include a central processing unit (CPU) interface or a micro controller unit (MCU) interface.

According to a frame memory controller 217, the frame memory 215 receives and stores a restored image signal DATA input through the second switch circuit 213. For example, the frame memory 215 may be a graphic memory.

The frame memory controller 217 may control a write operation or a read operation of the frame memory 215 based on an access control signal ACC output from a command decoder 220. According to example embodiments, the access control signal ACC may be control signals related to a write operation or a read operation.

The first selection circuit 219 may transmit a restored image signal DATA input through the first switch circuit 211 or an image signal output from the frame memory 215 to the display 300 as an output image signal DDATA based on a first selection signal SEL1.

For example, when the first selection signal SEL1 is a logic '0' or at a low level, the first selection circuit 219 outputs a restored image signal DATA input through the first switch circuit 211, and the first selection circuit 219 outputs an image signal output from the frame memory 215 when the first selection signal SEL1 is a logic '1' or at a high level. For example, the first selection circuit 219 may be a multiplexer.

The command decoder 220 decodes a command packet CP included in a packet PAC according to a clock signal CLK and generates an access control signal ACC, a plurality of switching signals SW1 and SW2, a plurality of selection signals SEL1 and SEL2 and an enable signal EN according to a decoding result.

The control circuit 230 may output a TE control signal TE and/or error information EI to the host 100.

According to an example embodiment, the control circuit 230 may transmit a TE control signal TE and error information EI to the host 100 to control generation timing or output timing of a packet PAC. According to another example embodiment, the control circuit 230 may transmit only error information EI to the host 100 to control the generation timing or the output timing of the packet PAC. According to still another example embodiment, the control circuit 230 may control generation timing of a TE control signal TE based on a control value TEV and transmit a TE control signal TE, which is generated as a result, to the host 100 to control the generation timing or the output timing of the packet PAC.

In addition, the control circuit 230 may output an internal vertical synchronization signal IVsync, which has a period equal to a period of the vertical synchronization signal Vsync, and an internal horizontal synchronization signal IHsync, which has a period equal to a period of the horizontal synchronization signal Hsync, in response to an enable signal EN.

The second selection circuit 240 may output a vertical synchronization signal Vsync during a video mode VM and output an internal vertical synchronization signal IVsync during a command mode CM based on a second selection signal SEL2.

The third selection circuit 250 may output a horizontal synchronization signal Hsync during a video mode VM and output an internal horizontal synchronization signal IHsync during a command mode CM based on the second selection signal SEL2.

For example, when the second selection signal SEL2 is a logic 0 or at a low level, each selection circuit 240 and 250 outputs each synchronization signal Vsync and Hsync to perform a video mode VM, and each selection circuit 240 and 250 outputs each internal synchronization signal IVsync and IHsync to perform a command mode CM when the second selection signal SEL2 is a logic 1 or at a high level.

When a mode change command included in a command packet CP is, for example, 2-bits, an operation mode of the display driver 200A and a state of each control signal SW1, SW2, SEL1 and SEL2 based on the mode change command are as shown in Table 1.

TABLE 1

| Bits of CP | Operation Mode | SW1 | SW2 | SEL1 | SEL2 |
|---|---|---|---|---|---|
| 00 | Command Mode | OFF | ON | H | H |
| 01 | Video Mode with Frame Memory | OFF | ON | H | H |
| 10 | Video Mode without Frame Memory | ON | OFF | L | L |
| 11 | Overlap Mode | ON | ON | L | L |

In Table 1, an overlap mode may be an operation in which the display driver 200A, before performing the command mode CM, bypasses image data input in the video mode VM to the display 300 and writes image data in the frame memory 215 while at the same time, during at least a frame according to a mode change command (MCC of FIG. 5), indicating a change from a video mode VM to a command mode CM.

A process how an operation mode of the display driver 200A is changed from a video mode VM transmitting first image data to the display 300 by bypassing a frame memory 215 to a command mode CM transmitting second image data to the display 300 through the frame memory 215 is explained with reference to FIGS. 1 to 5, as follows. In FIGS. 1-5, a frame rate of the first image data may be greater than a frame rate of the second image data.

During a video mode VM, a data/synchronization decoder 210 receives a packet PAC from the host 100 (S10), restores a vertical synchronization signal Vsync by using a vertical synchronization packet VS included in the packet PAC, restores a horizontal synchronization signal Hsync by using a horizontal synchronization packet HS included in the packet PAC, and restores data DATA from a data stream DS included in the packet PAC (S20).

The command decoder 220 generates a plurality of control signals SW1, SW2, SEL1 and SEL2 for performing a video mode VM based on a command packet CP included in the packet PAC. A level of each control signal SW1, SW2, SEL1 and SEL2 is as shown in Table 1.

The first selection circuit 219 transmits restored data DATA input through a first switch circuit 211 to the display 300, and each selection circuit 240 and 250 transmits each synchronization signal Vsync and Hsync to the display 300 (S30).

During a first interval INT1, a control circuit 230 generates a first count value by counting a period T1 of a vertical synchronization signal Vsync and generates a second count value by counting a period T2 of a horizontal synchronization signal Hsync (S40).

The host 100 transmits a packet PAC to the display driver 200A. The packet PAC includes a command packet 101, which includes a mode change command MCC indicating a change from a video mode to a command mode. The display driver 200A receives the command packet 101(S50). The mode change command MCC may be transmitted to the display driver 200A prior to at least one frame before a mode change is performed.

The command decoder 220 decodes bits included in the command packet 101, e.g., 00, and generates a plurality of control signals SW1, SW2, SEL1 and SEL2 according to a decoding result.

During an overlap interval INT2 (or second interval), restored data DATA are written in a frame memory 215 through a second switch circuit 213 as soon as bypassed to the display 300 through a first switch circuit 211 and a first selection circuit 219. Here, each synchronization signal Vsync and Hsync along with the restored data DATA may be transmitted to the display 300. Accordingly, the display 300 may display the restored data DATA by using each synchronization signal Vsync and Hsync.

After receiving a mode change command MCC, a control circuit 230 receives a last pulse LP of a vertical synchronization signal Vsync and generates an internal vertical synchronization signal IVsync having the same period T1 as a period T1 of the vertical synchronization signal Vsync by using a first count value. In addition, the control circuit 230 generates an internal horizontal synchronization signal IHsync having the same period T2 as a period T2 of a horizontal synchronization signal by using the internal vertical synchronization signal IVsync and a second count value (S60).

As illustrated in FIG. 5, a time interval T1 between a last pulse LP of the vertical synchronization signal Vsync and a first pulse FP of the internal vertical synchronization signal IVsync is equal to the period T1 of the vertical synchronization signal Vsync.

That is, the display driver 200A may generate a first pulse FP of the internal vertical synchronization signal IVsync immediately after the time interval T1 during a change from a video mode to a command mode, so that it may mitigate (or alternatively, prevent) an image flicker phenomenon which may occur in the display 300.

The command decoder 220 may control a second selection circuit 240 so that a time interval T1 between a last pulse LP of a vertical synchronization signal Vsync and a first pulse FP of an internal vertical synchronization signal IVsync may be equal to a period T1 of the vertical synchronization signal Vsync by adjusting a generation time point of a second selection signal SEL2.

Each selection circuit 219, 240 and 250 may transmit restored data DATA and each internal synchronization signal IVsync and IHsync to the display 300 based on each selection signal SEL1 and SEL2. Accordingly, the display driver 200A may perform a command mode from a third interval INT3.

In the third interval INT3, the host 100 may not transmit a vertical synchronization packet VS and a horizontal synchronization packet HS to the display driver 200A but transmit only a data stream packet DS to reduce power consumed in the host 100. Accordingly, the display driver 200A does not generate a vertical synchronization signal Vsync and a horizontal synchronization signal Hsync. The display driver 200A transmits restored data DATA to the display 300 through a frame memory 215.

Figure 6:
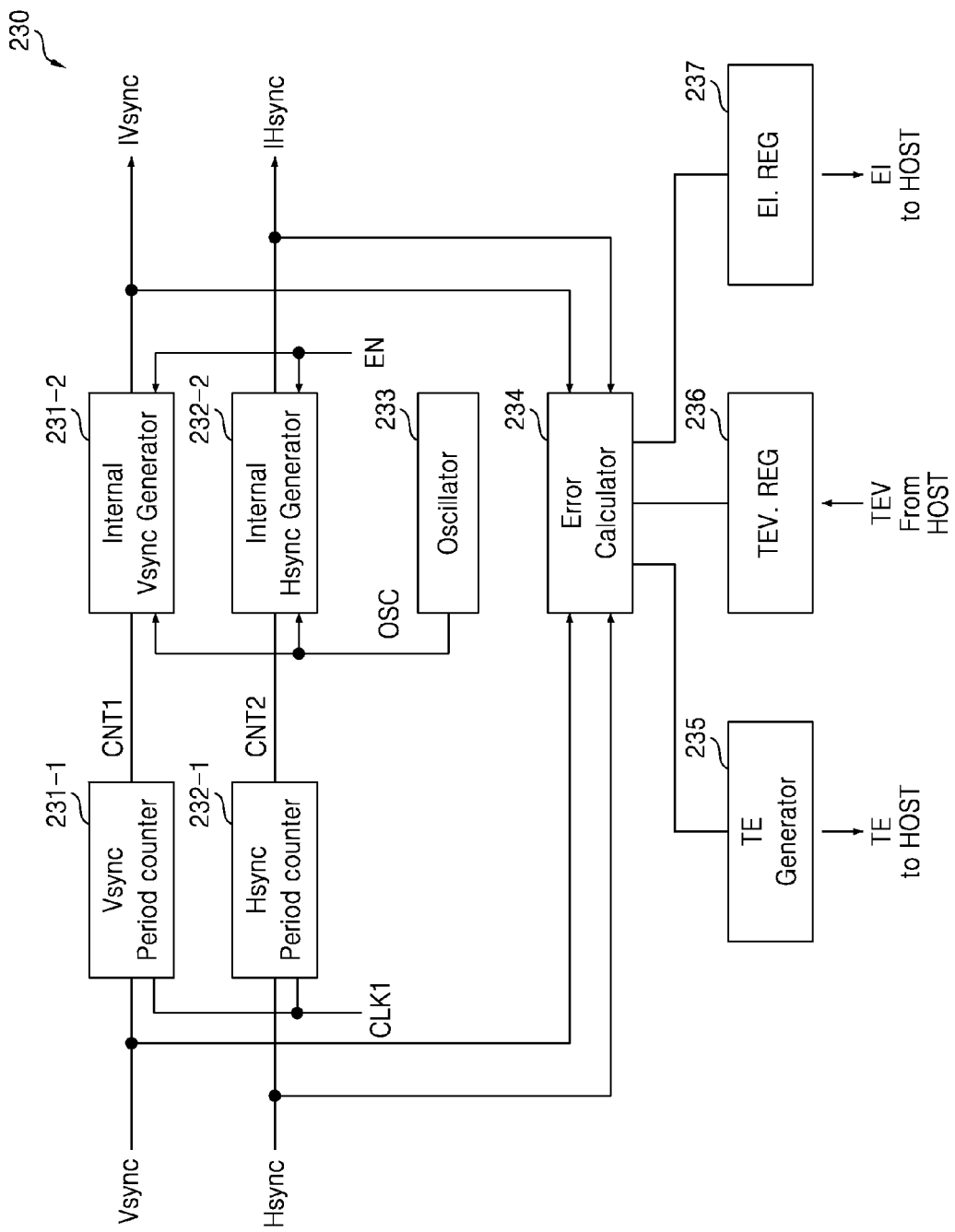
FIG. 6 is a block diagram of a control circuit illustrated in FIG. 3.

FIG. 6 is a block diagram of the control circuit illustrated in FIG. 3. Referring to FIGS. 3, 5 and 6, a control circuit 230 includes a vertical synchronization signal period counter 231-1, an internal vertical synchronization signal generator 231-2, a horizontal synchronization signal period counter 232-1, an internal horizontal synchronization signal generator 232-2, an oscillator 233, an error calculator 234, a TE control signal generator 235, a control value register 236 and an error information register 237.

The vertical synchronization signal period counter 231-1 counts a period T1 of a vertical synchronization signal Vsync by using a clock signal CLK1 and generates a first count value CNT1. The internal vertical synchronization signal generator 231-2 generates an internal vertical synchronization signal IVsync having a period T1 equal to a period T1 of the vertical synchronization signal Vsync by using a first count value CNT1 and an oscillation signal OSC output from the oscillator 233. The horizontal synchronization signal period counter 232-1 counts a period T2 of a horizontal synchronization signal Hsync by using a clock signal CLK1 and generates a second count value CNT2.

The internal horizontal synchronization signal generator 232-2 generates an internal horizontal synchronization signal IHsync having a period T2 equal to a period T2 of the horizontal synchronization signal Hsync by using a second count value CNT2 and an oscillation signal OSC output from the oscillator 233. Each synchronization signal generator 231-2 and 232-2 may control generation timing or output timing of each internal synchronization signal IVsync and IHsync in response to an enable signal EN.

According to an example embodiment, each synchronization signal period counter 231-1 and 232-1 may detect a last pulse of each synchronization signal Vsync and Hsync and output each control signal which may control an operation of each internal synchronization signal generator 231-2 and 232-2 according to a detection result. In this case, each synchronization signal period counter 231-1 and 232-1 may detect a last pulse.

The error calculator 234 may generate a first error value by calculating difference between a period T1 of a vertical synchronization signal Vsync and a period of an internal vertical synchronization signal IVsync, generate a second error value by calculating difference between a period T2 of a horizontal synchronization signal Hsync and a period of an internal horizontal synchronization signal IHsync, and store each of the first error value and the second error value in an error information register 237. For example, the error calculator 234 may calculate each of the first error value and the second error value based on a clock signal.

Each of the first error value and the second error value stored in the error information register 237 may be accessed by the host 100.

It is possible to generate an internal vertical synchronization signal IVsync having the same period as a period of a vertical synchronization signal Vsync; however, there may be an error between the period of the vertical synchronization signal Vsync and the period of the internal vertical synchronization signal IVsync in an example embodiment.

Likewise, it is possible to generate an internal horizontal synchronization signal IHsync having the same period as a period of a horizontal synchronization signal Hsync; however, there may be an error between the period of the horizontal synchronization signal Hsync and a period of the internal horizontal synchronization signal IHsync in an example embodiment.

The TE control signal generator 235 may control generation timing of a TE control signal TE based on the first error value provided by the error calculator 234.

The control value register 236 may store a control value TEV output from the host 100. The error calculator 234 may receive and interpret (analyze) the control value TEV, and control an operation of a TE control signal generator 235 based on an interpretation (analysis) result. Accordingly, the TE control signal generator 235 may control generation timing of a TE control signal TE by using the control value TEV.

Figure 7:
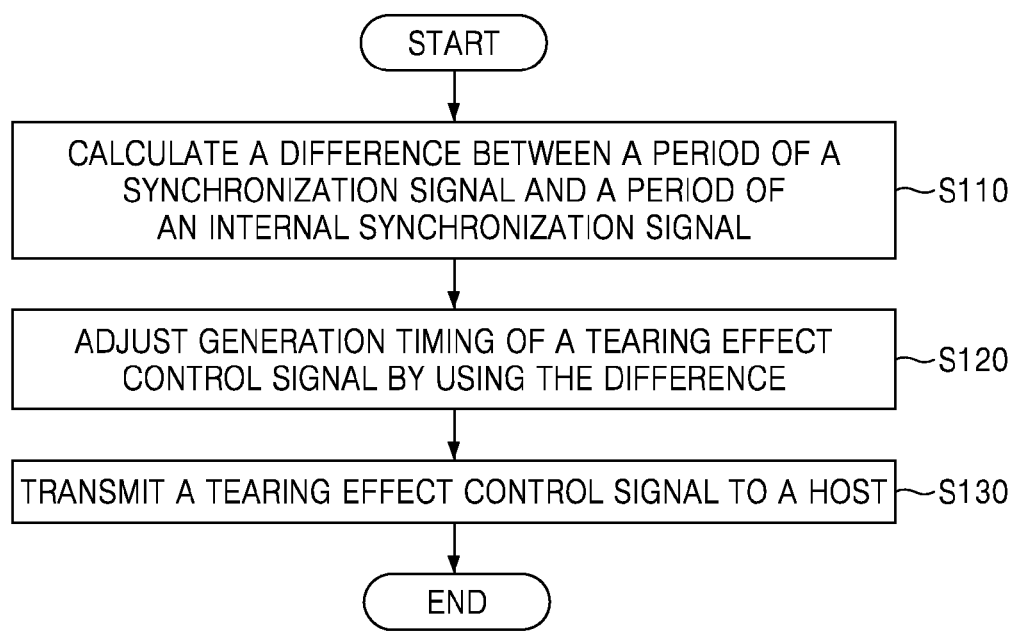
FIG. 7 is a flowchart explaining a method of controlling generation timing of a tearing effect control signal according to an example embodiment of inventive concepts.
Figure 8:
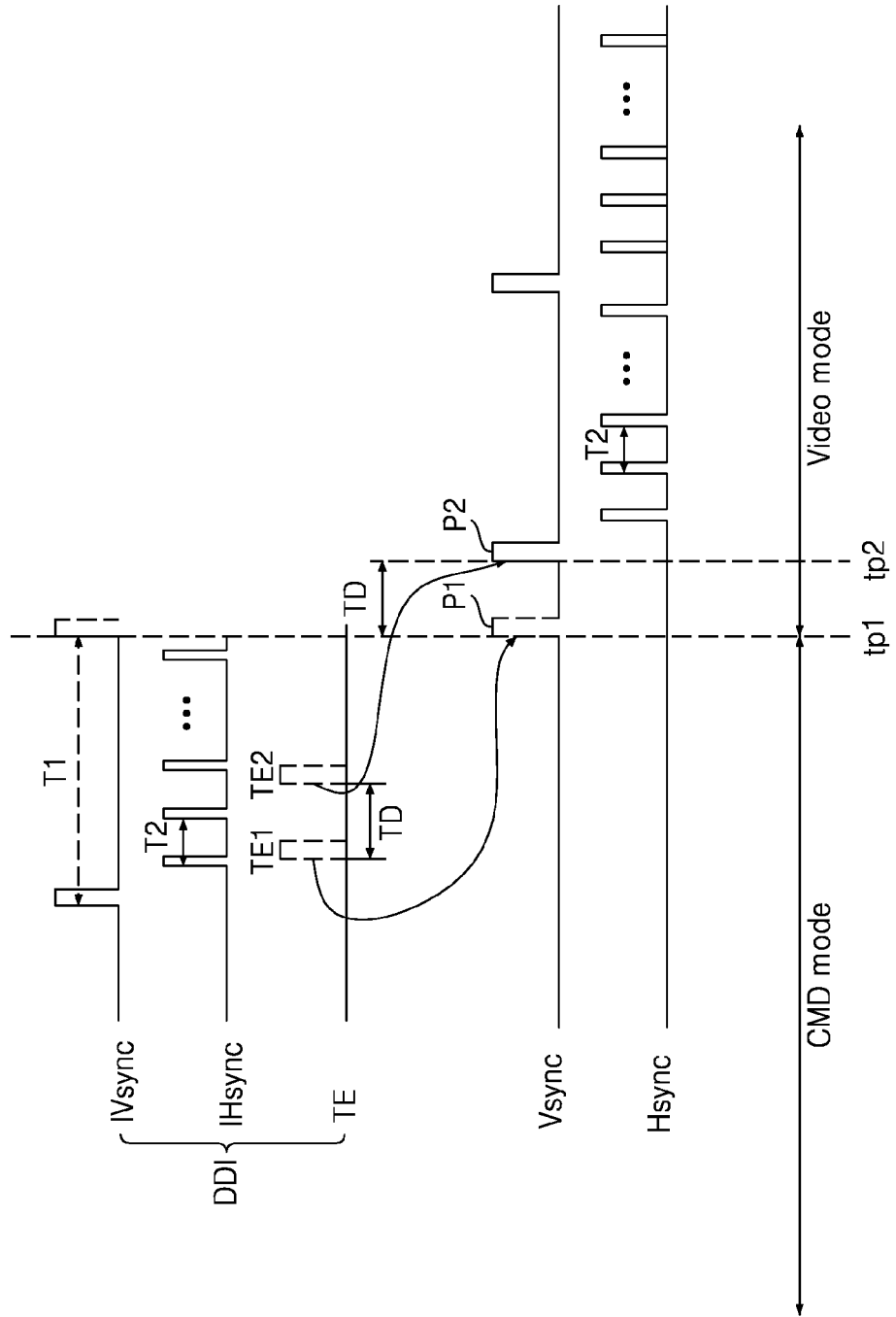
FIG. 8 is a timing diagram for explaining a method of controlling generation timing of a tearing effect control signal according to an example embodiment of inventive concepts.

FIG. 7 is a flowchart for explaining a method of controlling generation timing of a tearing effect control signal according to an example embodiment of inventive concepts. FIG. 8 is a timing diagram for explaining a method of controlling generation timing of the tearing effect control signal according to an example embodiment of the inventive concepts.

FIGS. 2, 3, 6, 7 and 8, discussed below, show a method of controlling, by the display driver 200A, generation time point of a TE control signal TE and a process in which an operation mode of the display driver 200A is changed from a video mode to a command mode according to a mode change command (103 of FIG. 2).

According to at least one example embodiment, image flicker does not occur in the display 300 at a mode change time point when handover from each internal synchronization signal IVsync and IHsync to each synchronization signal Vsync and Hsync is executed correctly.

In at least one example embodiment, a second TE control signal TE2 may be transmitted to the host 100. In this case, the host 100 generates a vertical synchronization packet VS related to a vertical synchronization signal Vsync according to the second TE control signal TE2. Accordingly, a pulse P2 of the vertical synchronization signal Vsync is generated at a second time point tp2. That is, when the vertical synchronization signal Vsync is delayed by a time delay TD, image flicker occurs in the display 300. Accordingly, generation timing of the second TE control signal TE2 may need adjusting.

The error calculator 234 calculates a difference between a period of a vertical synchronization signal Vsync and a period of an internal vertical synchronization signal IVsync, i.e., a first error value, and stores it in the error information register 237 (S110). The error calculator 234 transmits a control signal for controlling generation timing of a TE control signal TE to a TE control signal generator 235 based on a first error value stored in the error information register 237 (S120).

The TE control signal generator 235 transmits a first TE control signal TE1 generated according to the control signal to the host 100 (S130). The host 100 generates a vertical synchronization packet VS related to a pulse P1 of a vertical synchronization signal Vsync to be generated at a first time point tp1 based on the first TE control signal TE1.

On a basis of the first time point tp1, handover from an internal vertical synchronization signal IVsync to a vertical synchronization signal Vsync is executed correctly, so that image flicker may not occur in the display 300. That is, a first pulse P1 of the vertical synchronization signal Vsync may be generated at a first time point tp1.

Figure 9:
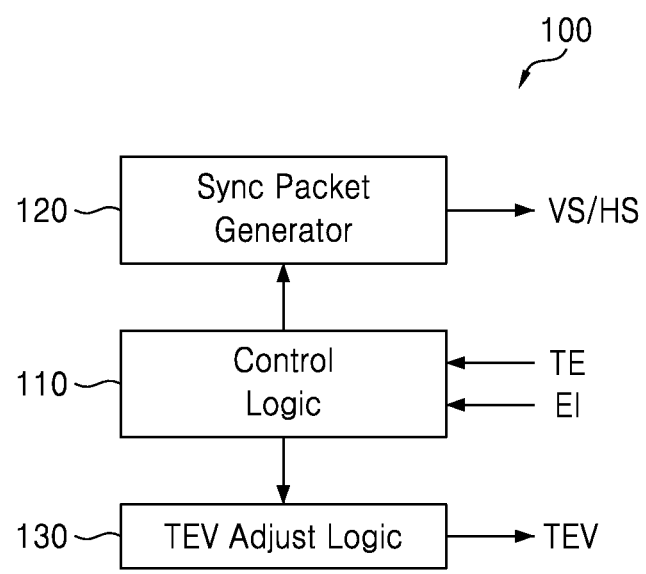
FIG. 9 is an internal block diagram of the host illustrated in FIG. 1.
Figure 10:
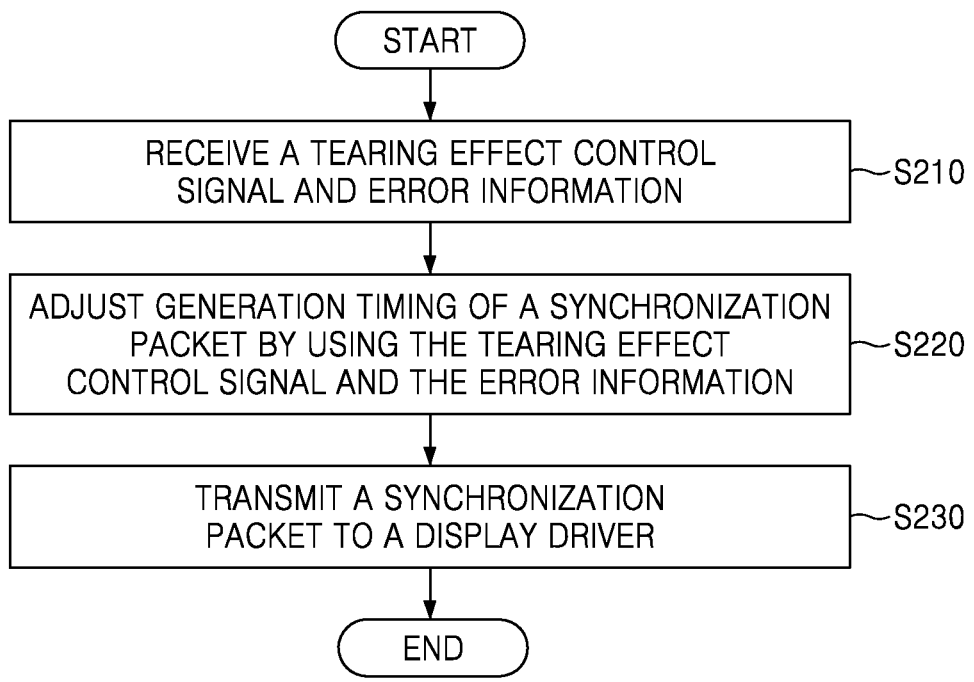
FIG. 10 is a flowchart explaining a method of controlling generation timing of a synchronization packet of the host illustrated in FIG. 9.

FIG. 9 is an internal block diagram of the host illustrated in FIG. 1, and FIG. 10 is a flowchart explaining a method of controlling synchronization packet generation timing of the host illustrated in FIG. 9. Referring to FIGS. 1, 9 and 10, the host 100 may include control logic 110 and a synchronization packet generator 120 according to an example embodiment. The host 100 may include the control logic 110 and control value adjust logic 130 according to another example embodiment. The host 100 may include the control logic 110, a synchronization packet generator 120 and the control value adjust logic 130 according to still another example embodiment.

FIGS. 1, 2, 8, 9 and 10, discussed below, explain a process in which an operation mode of the display driver 200A is changed from a command mode to a video mode based on a mode change command (103 of FIG. 2) according to at least one example embodiment.

As described above, image flicker does not occur in the display 300 when handover from each internal synchronization signal IVsync and IHsync to each synchronization signal Vsync and Hsync is executed correctly at a mode change time point.

After a packet PAC including a mode change command (103 of FIG. 2) is transmitted to the display driver 200A, the control logic 110 receives a TE control signal TE and error information EI output from the display driver 200A (S210) and outputs a control signal for adjusting generation timing of a synchronization packet to a synchronization packet generator 120 by using the TE control signal TE and the error information EI.

Since rising edge timing of a first pulse FP of a vertical synchronization signal Vsync is determined based on a rising edge of a TE control signal TE, the control logic 110 outputs a control signal to a synchronization packet generator 120 so that a rising edge of a first pulse P1 of the vertical synchronization signal Vsync may be generated at a first time point tp1 by using the TE control signal TE and error information EI. Accordingly, the synchronization packet generator 120 may generate a vertical synchronization packet VS so that a rising edge of a first pulse P1 of the vertical synchronization signal Vsync may be generated at a first time point tp1 in response to the control signal, and transmit a generated vertical synchronization packet VS to the display driver 200A.

In other words, the synchronization packet generator 120 may adjust generation timing or output timing of each synchronization packet VS and HS based on the control signal (S220). Accordingly, the synchronization packet generator 120 transmits a packet PAC including each generated synchronization packet VS and HS to the display driver 200A (S230).

Figure 11:
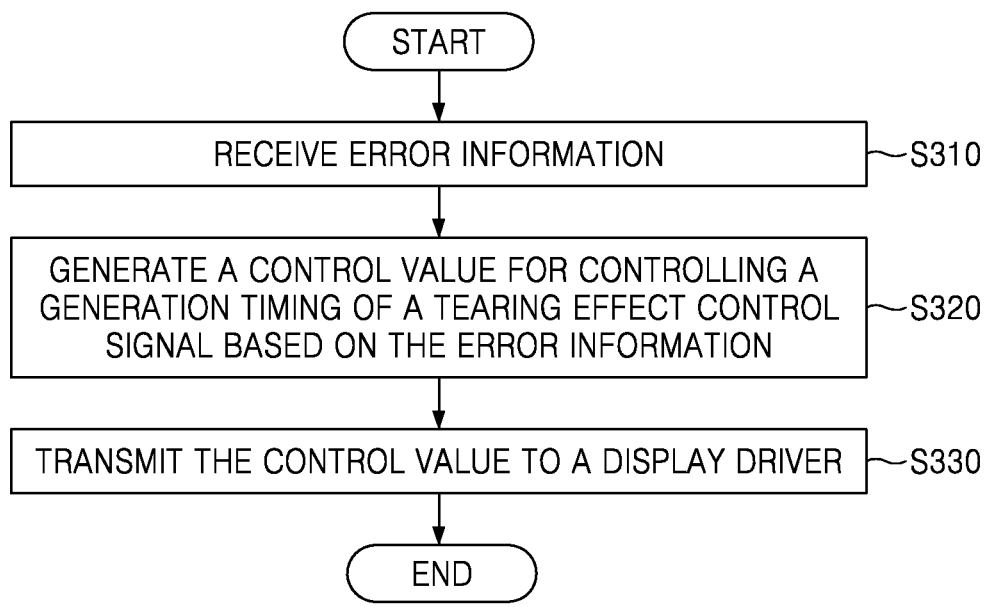
FIG. 11 is a flowchart explaining a method of generating a control value for controlling generation timing of a tearing effect control signal of the host illustrated in FIG. 9.

FIG. 11 is a flowchart for explaining a method of generating a control value for adjusting generation timing of a tearing effect control signal of the host illustrated in FIG. 9. FIGS. 1, 2, 8, 9 and 11, discussed below, explain a process in which an operation mode of the display driver 200A is changed from a command mode to a video mode according to at least one example embodiment.

When handover from each internal synchronization signal IVsync and IHsync to each synchronization signal Vsync and Hsync is executed correctly at a mode change time point, image flicker does not occur in the display 300. After a packet PAC including a mode change command (103 of FIG. 2) is transmitted to the display driver 200A, the control logic 110 receives error information EI output from the display driver 200A (S310) and outputs error information EI to a control value adjust logic 130.

The control value adjust logic 130 generates a control value TEV for controlling generation timing of a TE control signal based on the error information EI (S320), and transmits a generated control value TEV to a control value register 236 of the display driver 200A (S330). Accordingly, a TE control signal generator 235 may generate a TE control signal TE based on a control value TEV stored in the control value register 236.

Figure 12:
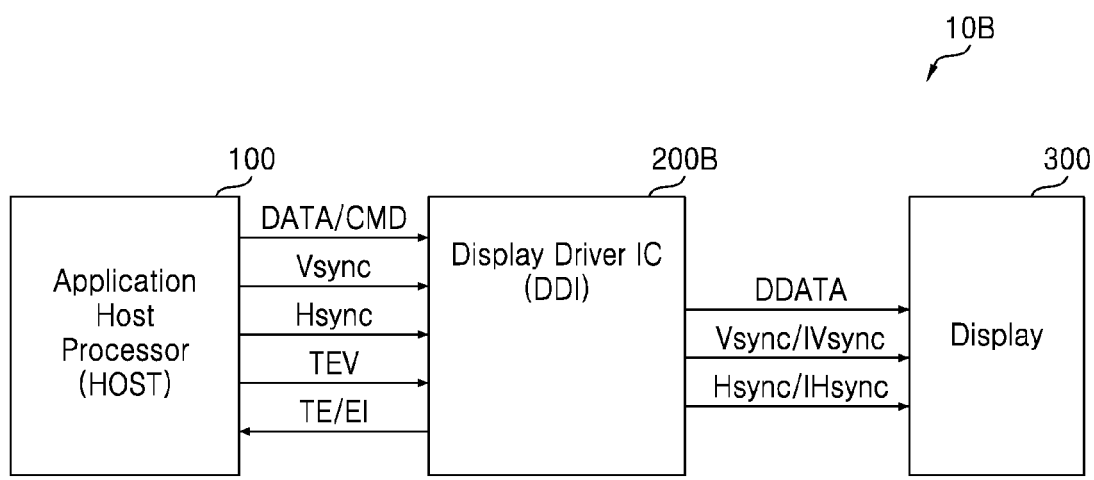
FIG. 12 is a block diagram of an image signal processing system according to another example embodiment of inventive concepts.

FIG. 12 is a block diagram of an image signal processing system according to another example embodiment of the inventive concepts. The image signal processing system 10B includes a host 100, a display driver 200B and a display 300.

The host 100 transmits data DATA and a command CMD, a vertical synchronization signal Vsync, a horizontal synchronization signal Hsync and a control value TEV to the display driver 200B. The display driver 200B transmits a TE control signal TE and/or error information EI to the host 100.

The display driver 200B transmits data DATA, a vertical synchronization signal Vsync, and a horizontal synchronization signal Hsync to the display 300 based on an operation mode, e.g., a video mode. Additionally, the display driver 200B transmits data DATA, an internal vertical synchronization signal IVsync and an internal horizontal synchronization signal IHsync to the display 300 based on an operation mode, e.g., a command mode.

Figure 13:
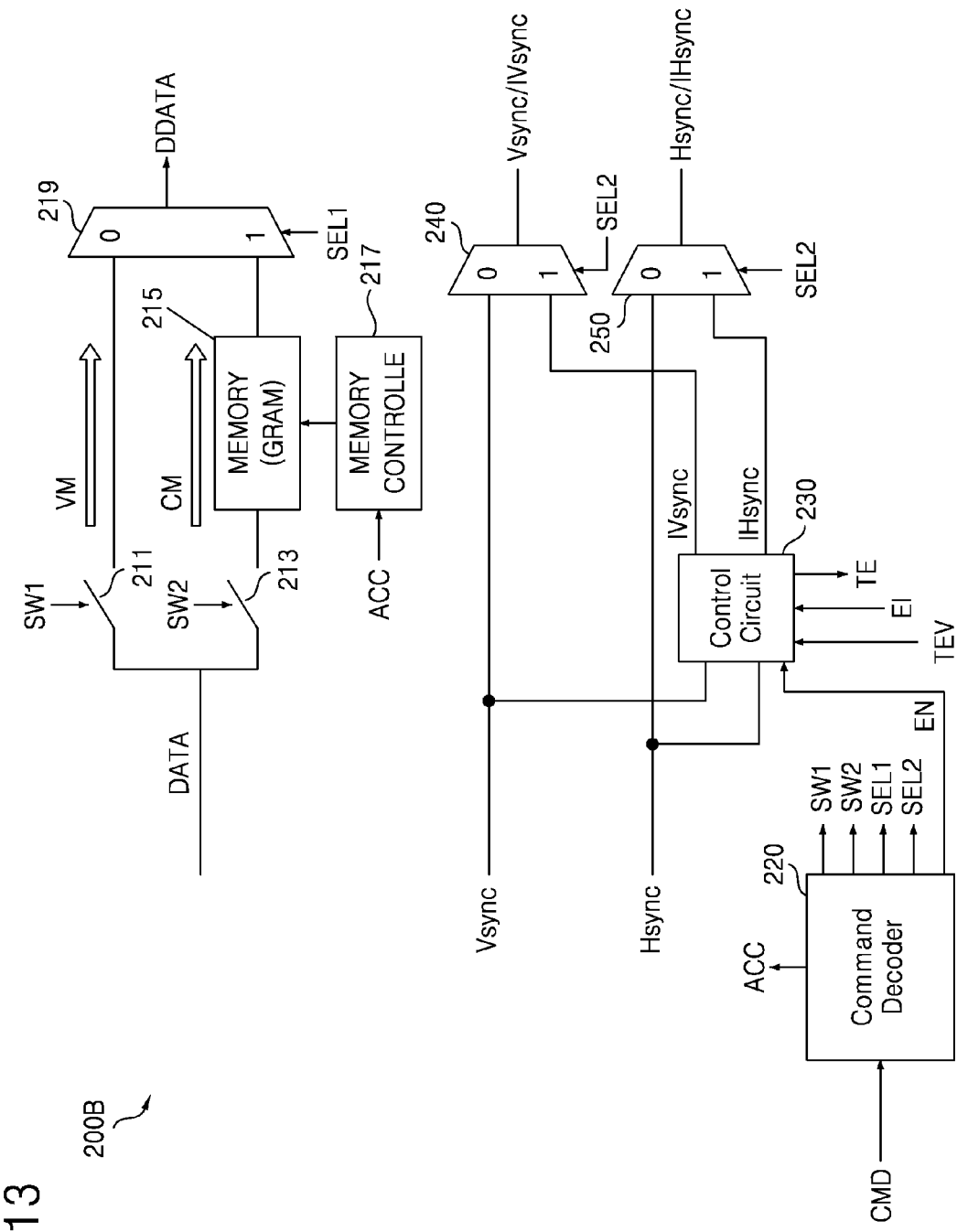
FIG. 13 is an example embodiment of a block diagram of the display driver illustrated in FIG. 12.

FIG. 13 is an example embodiment of a block diagram of the display driver illustrated in FIG. 12.

Referring to FIGS. 3 and 13, except for a data/synchronization decoder 210, a structure and an operation of the display driver 200B illustrated in FIG. 13 are substantially equal to a structure and an operation of the display driver 200A illustrated in FIG. 3.

Figure 14:
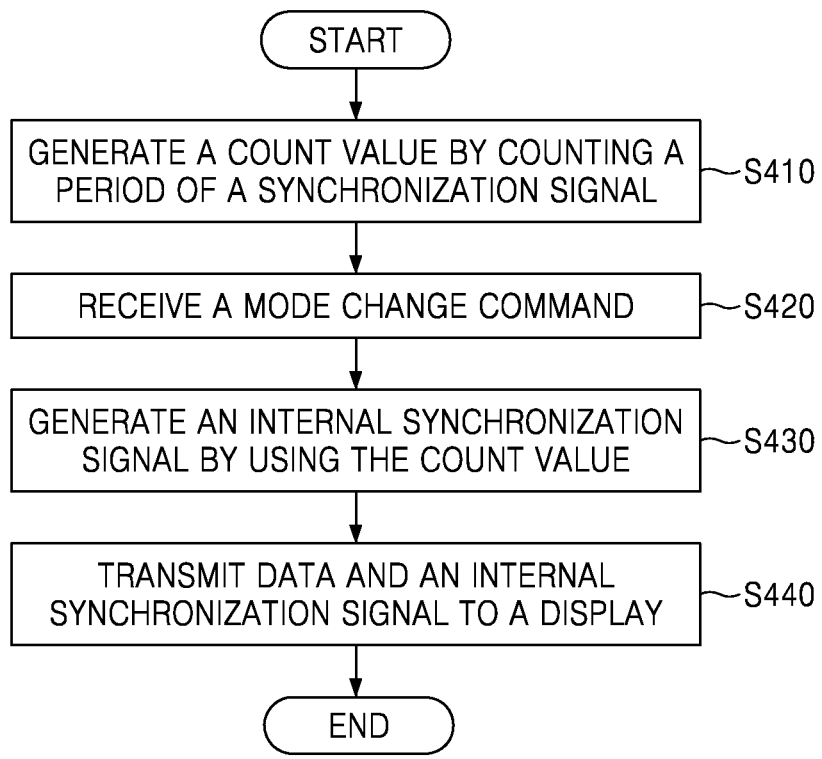
FIG. 14 is a flowchart explaining an operation of the display driver illustrated in FIG. 12.

FIG. 14 is a flowchart explaining an operation of the display driver illustrated in FIG. 12. Referring to FIGS. 2, 6, 12, 13 and 14, a control circuit 230 counts a period of each synchronization signal Vsync and Hsync and generates each count value CNT1 and CNT2 (S410).

A command decoder 220 receives a command packet 101 which includes a mode change command for changing an operation mode of the display driver 200B from a video mode to a command mode (S420).

As described above, the control circuit 230 generates each internal synchronization signal IVsync and IHsync having a period equal to a period of each synchronization signal Vsync and Hsync by using each count value CNT1 and CNT2 (S430). The display driver 200B operating in a command mode transmits data DATA and each internal synchronization signal IVsync and IHsync to the display driver 300 (S440). The display driver 200B operating in a video mode transmits data DATA and each synchronization signal Vsync and Hsync to the display driver 300.

According to an example embodiment, a control value TEV and error information EI may be stored in a non-volatile memory which may be included in the host 100 or display driver 200A or 200B. Accordingly, information TEV and EI, which is stored in the non-volatile memory during an initialization operation of the host 100 or the display driver 200A and 200B, may be loaded on each register 236 and 237. According to another example embodiment, control value TEV and error information EI may be updated every frame at real time.

A display driver according to an example embodiment of the inventive concepts may perform a mode change between a video mode and a command mode based on a mode change command during an operation. Accordingly, power consumed in the display driver may be effectively reduced.

Figure 15:
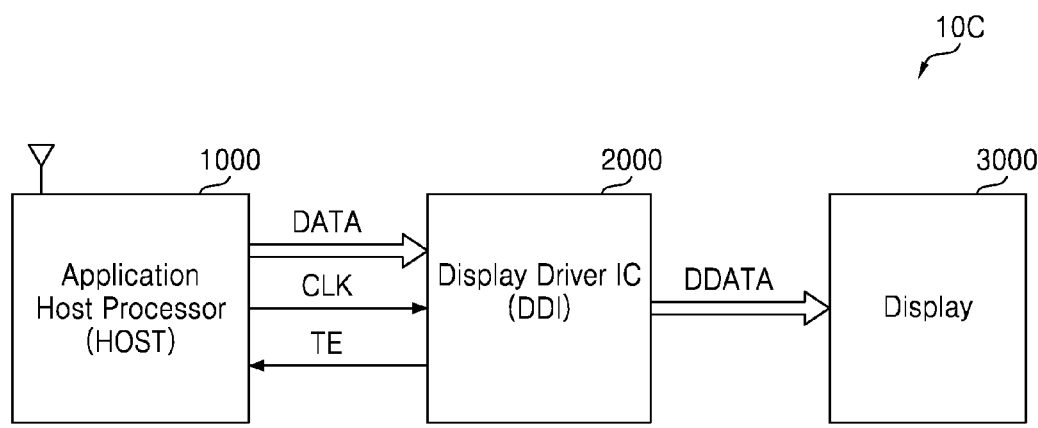
FIG. 15 is a block diagram of an image signal processing system according to some example embodiments.

FIG. 15 is a block diagram of an image signal processing system 10C according to some example embodiments. Referring FIG. 15, the image signal processing system 10C may be a mobile device, a handheld device, or a handheld computer, e.g., a mobile phone, a smart phone, a tablet personal computer (PC), a personal digital assistant (PDA), or a portable multimedia player (PMP), etc., which can display a still image signal (or a still image) or a moving image signal (or a moving image) on a display.

The image signal processing system 10C includes an application host processor (hereinafter, referred to as a host) 1000, a display driver (or a display driver integrated circuit (IC)) 2000, and a display 3000.

The host 1000 transmits to the display driver 2000 an image signal DATA including a mode change command indicating whether an image signal to be displayed on the display 3000 is a still image signal or a moving image signal according to whether a codec in the host 1000 is executed. The mode change command may be control signals for controlling an operation mode of the display driver 2000.

The image signal DATA including the mode change command is transmitted to the display driver 2000 in response to a clock signal CLK.

The host 1000 receives a tearing effect (TE) control signal TE from the display driver 2000 and controls transmission timing of the image signal DATA according to the level of the TE control signal TE. The TE control signal TE is a control signal that may mitigate (or alternatively, prevent) tearing or screen tearing.

The display driver 2000 includes an interface which processes a still image signal, and an interface which processes a moving image signal. The display driver 2000 may select either of the interfaces in response to the mode change command received from the host 1000. The display driver 2000 transmits an output image signal DDATA, e.g., a still image signal or a moving image signal, received from the host 1000 to the display 3000 through the selected interface.

The display 3000 displays the output image signal DDATA received from the display driver 2000. The display 3000 may be implemented by a liquid crystal display (LCD), a light emitting diode (LED) display, an organic LED (OLED) display, or an active-matrix OLED (AMOLED) display, etc.

Figure 16:
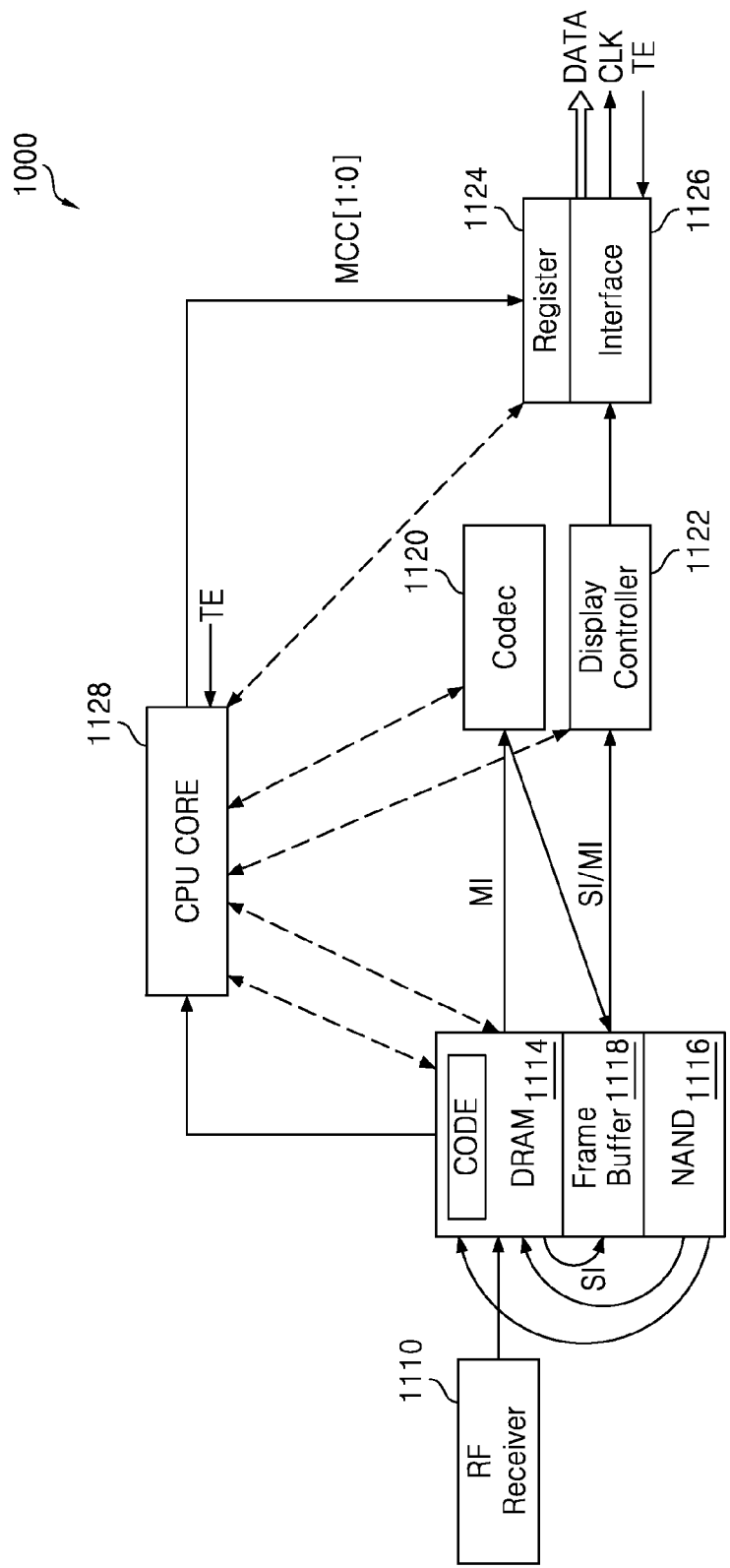
FIG. 16 is a schematic block diagram of an application host processor illustrated in FIG. 14.

FIG. 16 is a schematic block diagram of the host 1000 illustrated in FIG. 15. The dotted lines in FIG. 16 represent command execution paths. Referring to FIG. 16, the host 1000 includes a radio frequency (RF) receiver 1110, a volatile memory like a dynamic random access memory (DRAM) 1114, a non-volatile memory like a NAND flash memory 1116, a frame buffer 1118, a codec 1120, a display controller 1122, an interface 1126 including a register 1124, and a central processing unit (CPU) core 1128.

The CPU core 1128, which controls the overall operation of the host 1000, controls the operations of the elements 1114, 1116, 1118, 1120, 1122, 1124, and 1126 and executes an execution code CODE.

When a user plays a moving image signal MI on the display 3000, that is, when the codec 1120 is operated (or executed) by the execution code CODE, the CPU core 1128 detects the operation (or execution) of the codec 1120, generates a mode change command MCC [1:0] according to a detection result, and transmits the mode change command MCC [1:0] to the register 1124.

For instance, when an event related to playback of the moving image signal MI occurs, an event handler function related to the event is called from the main function of the execution code CODE. When the event handler function calls the codec 1120, the CPU core 1128 determines that an image signal to be displayed on the display 3000 is the moving image signal MI based on the execution of the execution code CODE and/or the call.

For instance, when the mode change command MCC [1:0] is 2 bits, operation modes of the display driver 2000 are as shown in Table 2. In other words, the display driver 2000 may switch between a command mode, in which a still image signal is processed, and a video mode, in which a moving image signal is processed, according to the mode change command MCC[1:0]. A bridge mode may be provided to reduce (or alternatively, prevent) the possibility of a dummy image signal of a memory (204-3 in FIG. 19) being output to the display 300 due to an internal scan operation when the operation mode of the display driver 2000 is switched from the command mode to the video mode.

TABLE 2

| MCC[1:0] | Operation mode |
| --- | --- |
| 00 | Command mode |
| 01 | Video mode with memory |
| 10 | Video mode without memory |
| 11 | Bridge mode |

The operation of the display driver 2000 in each mode will be described in detail with reference to the relevant drawings later.

When a user plays a still image signal SI on the display 3000, e.g., when the operation of the codec 1120 is terminated by the execution code CODE or when the codec 1120 is not operated, the CPU core 1128 detects the termination of the operation of the codec 1120 or the non-operation of the codec 1120, generates the mode change command MCC [1:0] according to a detection result, and transmits the mode change command MCC [1:0] to the register 1124.

For instance, when the operation of the codec 1120 is terminated by an end event and the event handler function called to drive (or execute) the codec 1120 is returned to the main function in order to display the still image signal SI on the display 3000, the CPU core 1128 detects the return and determines that an image signal to be displayed on the display 3000 is the still image signal SI.

The following is an example of the execution code CODE:

Main function { booting code function ( );
...
display driver IC execution function ( )
... };
display driver IC execution function { if (DMB execution = OK) then call Codec driving function ( );
if (internet moving image = OK) then call Codec driving function ( );
if (game execution = OK) then call Codec driving function ( );};
Codec driving function {MCC=10
...

-continued if (DMB finish=OK) then MCC=11 1 frame before end and then MCC=00 and then return to Main function};

The RF receiver 1110 receives an image signal, e.g., the still image signal SI or the moving image signal MI, through Internet or digital multimedia broadcasting (DMB) and stores the image signal in the DRAM 1114 and/or the NAND flash memory 1116.

When the host 1000 is booted, the execution code CODE stored in the NAND flash memory 1116 is loaded to the DRAM 1114. The execution code CODE loaded to the DRAM 1114 is sequentially executed. The execution code CODE stored in the NAND flash memory 1116 may be loaded to the DRAM 1114 in real time according to the control of the CPU core 1128.

The NAND flash memory 1116 may store a still image signal, a moving image signal, a game program, a start program, e.g., an execution code, and/or an application. The still image signal, the moving image signal, the game program, the start program, e.g., the execution code, and/or the application stored in the NAND flash memory 1116 may be loaded to the DRAM 1114 according to the control of the CPU core 1128.

The frame buffer 1118 stores the still image signal SI received from the DRAM 1114 or the moving image signal MI received from the codec 1120. For instance, when the still image signal SI is displayed on the display 3000, the still image signal SI stored in the DRAM 1114 is transmitted directly to the frame buffer 1118. However, when the moving image signal MI is displayed on the display 3000, the moving image signal MI stored in the DRAM 1114 is processed by the codec 1120 before being transmitted to the frame buffer 1118.

The codec 1120 may be a hardware or a computer program that can encode and/or decode a data stream or a signal. For instance, the codec 1120 decodes the moving image signal MI received from the DRAM 1114 and transmits a decoded moving image signal to the frame buffer 1118.

The display controller 1122 controls the transmission of the still image signal SI or the moving image signal MI from the frame buffer 1118 to the interface 1126.

The interface 1126 transmits the clock signal CLK and the image signal DATA, e.g., a still image signal or a moving image signal, to the display driver 2000.

According to the control of the display controller 1122, the interface 1126 converts a still image signal into a signal suitable to the command mode and converts a moving image signal into a signal suitable to the video mode.

The interface 1126 may convert a still image signal into a signal suitable to the command mode and convert a moving image signal into a signal suitable to the video mode with reference to the mode change command MCC [1:0] stored in the register 1124. Here, the command mode is a mode in which a still image signal is processed and the video mode is a mode in which a moving image signal is processed.

The interface 1126 also transmits the TE control signal TE from the display driver 2000 to the CPU core 1128.

In response to the TE control signal TE, the CPU core 1128 may control the operation of the interface 1126 to control the generation timing of the mode change command MCC[1:0] and/or the transmission timing of the image signal DATA as shown in FIG. 22, 24, 27, or 30.

Figure 17:
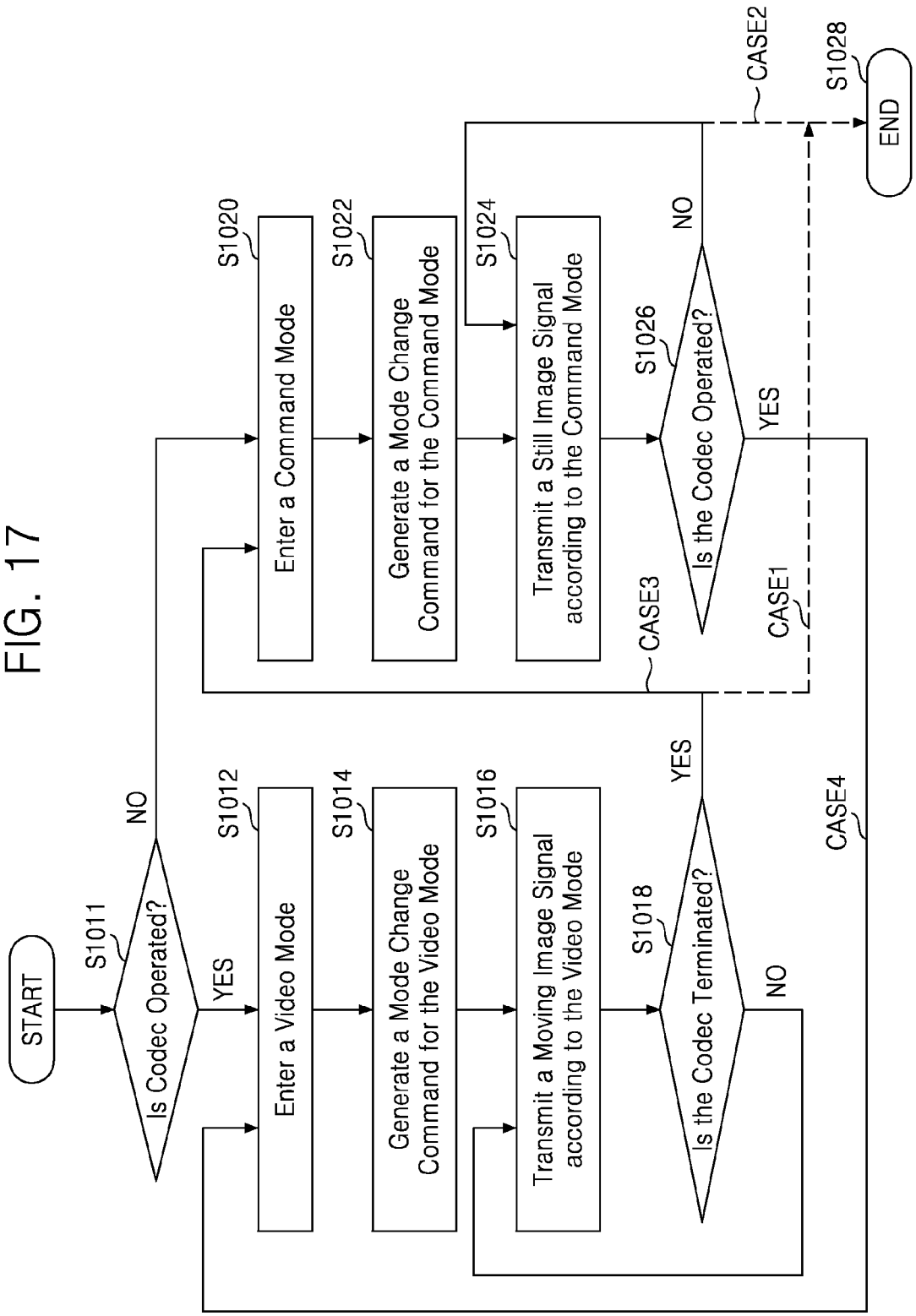
FIG. 17 is a flowchart of the operations of the application host processor illustrated in FIG. 16.
Figure 18:
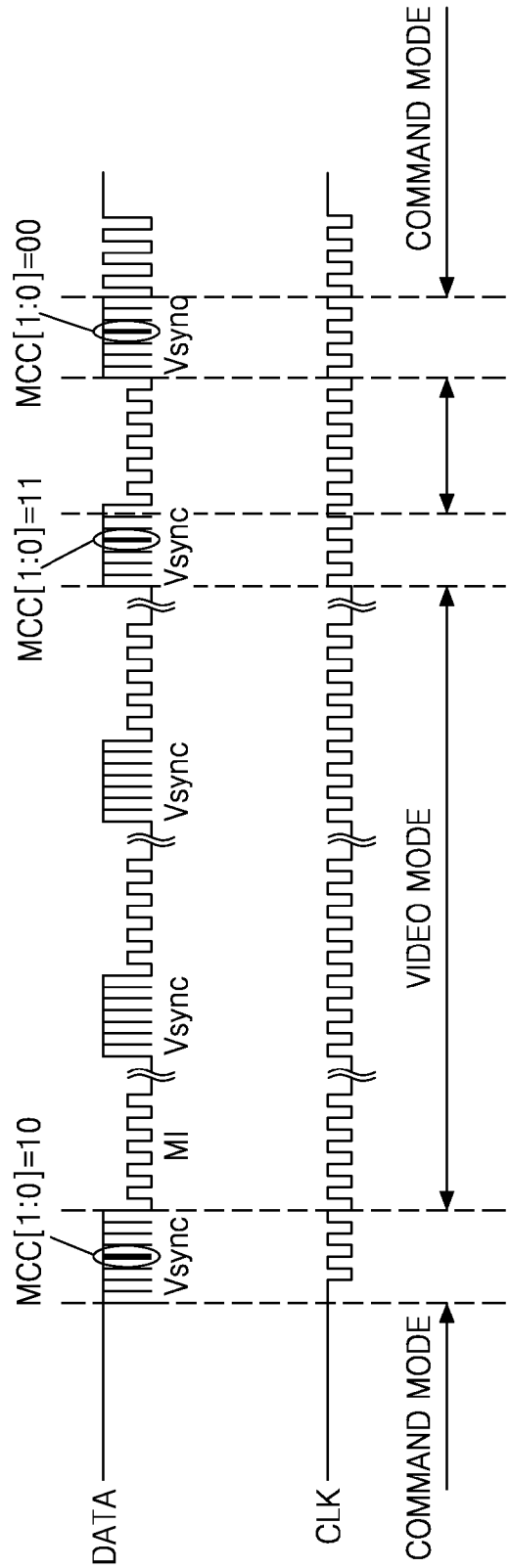
FIG. 18 is a waveform diagram of a clock signal and an image signal including a mode change command output from the application host processor illustrated in FIG. 16.

FIG. 17 is a flowchart of the operations of the host 1000 illustrated in FIG. 16. FIG. 18 is a waveform diagram of the clock signal CLK and the image signal DATA including the mode change command MCC[1:0] output from the host 1000 illustrated in FIG. 14.

The operations of the host 1000 will be described in detail with reference to FIGS. 15 through 18.

First, case 1 CASE 1, in which the operation of the host 1000 ends after the moving image signal MI is displayed on the display 3000, will be described. When the codec 1120 is operated to play the moving image signal MI on the display 3000 in operation S1011, the CPU core 1128 detects the operation of the codec 1120 and enters the video mode according to a detection result in operation S1012.

The CPU core 1128 generates the mode change command MCC[1:0] (=10) for enabling the display driver 2000 to operate in the video mode and transmits it to the register 1124 in operation S1014. The display controller 1122 transmits the moving image signal MI from the frame buffer 1118 to the interface 1126. The interface 1126 transmits the moving image signal MI as the image signal DATA suitable for the video mode to the display driver 2000 with reference to the mode change command MCC [1:0] (=10) stored in the register 1124 in operation S1016.

As illustrated in FIG. 18, the mode change command MCC [1:0] (=10) is embedded in a vertical synchronization signal Vsync and is transmitted to the display driver 2000 over (or together with) the image signal DATA. The display driver 2000 distinguishes the moving image signal MI from the vertical synchronization signal Vsync based on the level and the packet type of each of the signals Vsync and MI. For instance, the mode change command MCC[1:0] may be embedded in the vertical synchronization signal Vsync in the form of a packet.

The image signal DATA including the vertical synchronization signal Vsync and the moving image signal MI may be transmitted from the host 1000 to the display driver 2000 in response to the clock signal CLK.

Accordingly, the display driver 2000 may enter the video mode without memory according to the mode change command MCC[1:0] (=10). The video mode without memory will be described with reference to FIGS. 19 and 20.

When the operation of the codec 1120 is terminated in operation S1018, the play of the moving image signal MI on the display 3000 ends in operation S1028. Until the operation of the codec 1120 is terminated in operation S1018, the host 1000 transmits a new moving image signal to the display driver 2000 according to the video mode in operation S1016.

Second, case 2 CASE2, in which the operation of the host 1000 ends after the still image signal SI is displayed on the display 3000, will be described. When the codec 1120 is not operated in operation S1011, the CPU core 1128 detects the non-operation of the codec 1120 and enters the command mode according to a detection result in operation S1020.

The CPU core 1128 generates the mode change command MCC [1:0] (=00) for enabling the display driver 2000 to operate in the command mode and transmits it to the register 1124 in operation S1022. The display controller 1122 transmits the still image signal SI from the frame buffer 1118 to the interface 1126. The interface 1126 transmits the still image signal SI as the image signal DATA suitable for the command mode to the display driver 2000 with reference to the mode change command MCC [1:0] (=00) stored in the register 1124 in operation S1024.

As illustrated in FIG. 18, the mode change command MCC [1:0] (=00) is embedded in a vertical synchronization signal Vsync in the form of a packet and is transmitted to the display driver 2000. At this time, the image signal DATA includes the vertical synchronization signal Vsync and the still image signal.

Whenever the frame buffer 1118 is updated with a new still image signal, the host 1000 transmits the new still image signal to the display driver 2000 according to the command mode in operation S1024. When the codec 1120 is not operated and the play of the still image signal SI ends in operation S1026, the play of the still image signal SI on the display 3000 ends in operation S1028.

Third, case 3 CASE3, in which the still image signal SI is displayed on the display 3000 immediately after the moving image signal MI is displayed on the display 3000, will be described. When the operation of the codec 1120 is terminated in operation S1018 while the moving image signal MI is being displayed on the display 3000, the CPU core 1128 of the host 1000 detects the termination of the operation of the codec 1120 and enters the command mode according to a detection result in operation S1020.

Switching from the video mode to the command mode will be described with reference to FIGS. 22, 24, 27, and 30.

Fourth, case 4 CASE4, in which the moving image signal MI is displayed on the display 3000 immediately after the still image signal SI is displayed on the display 3000, will be described. When the codec 1120 is operated in operation S1026 while the still image signal SI is being displayed on the display 3000, the CPU core 1128 detects the operation of the codec 1120 and enters the video mode according to a detection result in operation S1012.

Switching from the command mode to the video mode will be described with reference to FIGS. 22, 24, 27, and 30.

Figure 19:
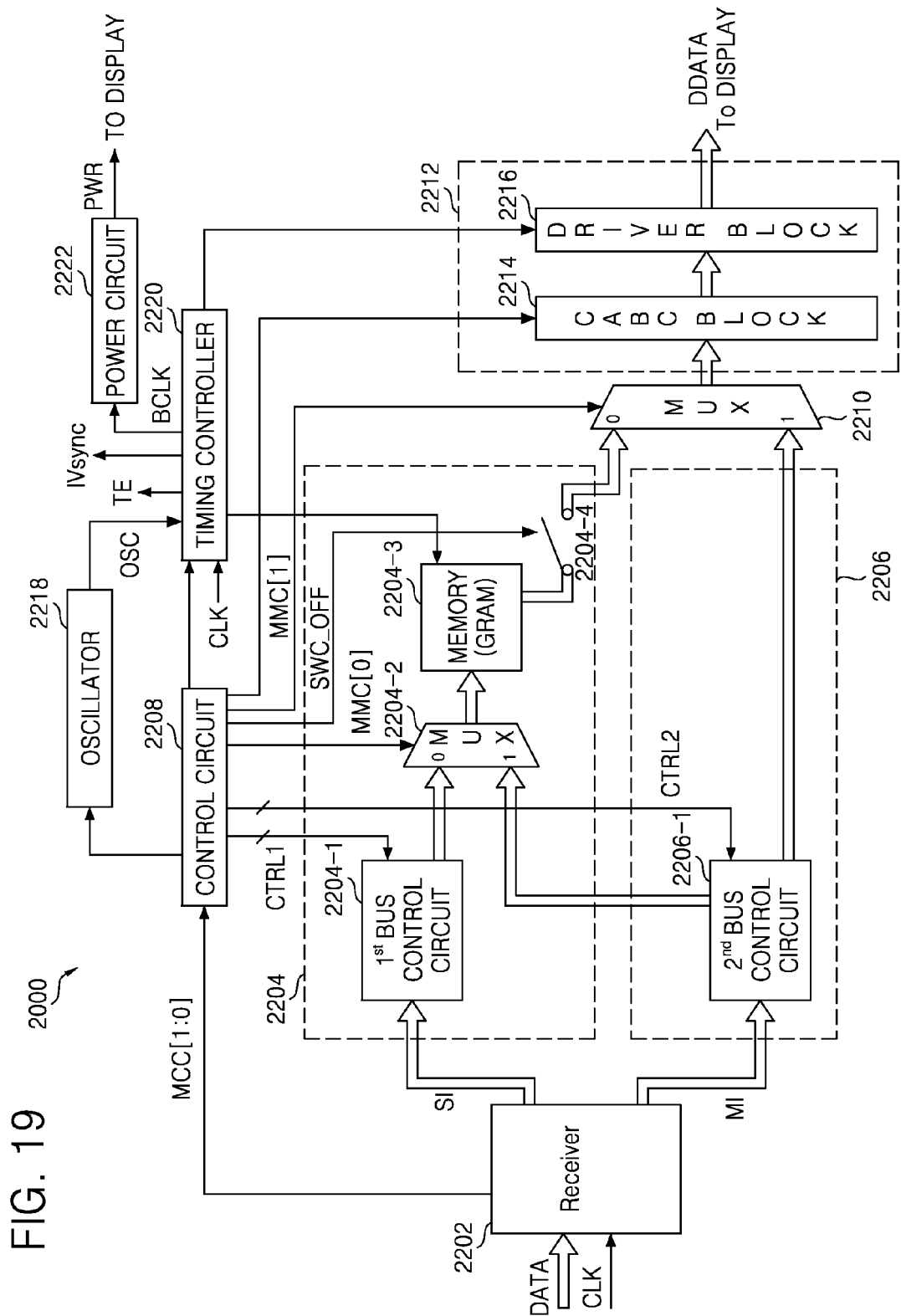
FIG. 19 is a schematic block diagram of a display driver illustrated in FIG. 15.

FIG. 19 is a schematic block diagram of the display driver 2000 illustrated in FIG. 15. The display driver 2000 may perform one of the four operation modes shown in Table 2 according to the mode change command MCC [1:0] output from the host 1000 and included in the image signal DATA.

The command mode may be performed when the mode change command MCC[1:0] is "00," which is the operation mode in which the still image signal SI is transmitted to the display 3000 using elements 2204-1, 2204-2, 2204-3, and 2204-4 included in a first interface 2204. In the command mode, the still image signal SI is transmitted to the display 3000 through a first path PATH1 illustrated in FIG. 20, 25, or 28.

The video mode with memory, which is performed when the mode change command MCC[1:0] is "01" is the operation mode in which the moving image signal MI, is transmitted to the display 3000 using a second switching circuit 2206-1 included in a second interface 2206 and the elements 2204-2, 2204-3, and 2204-4 included in the first interface 2204.

Figure 28:
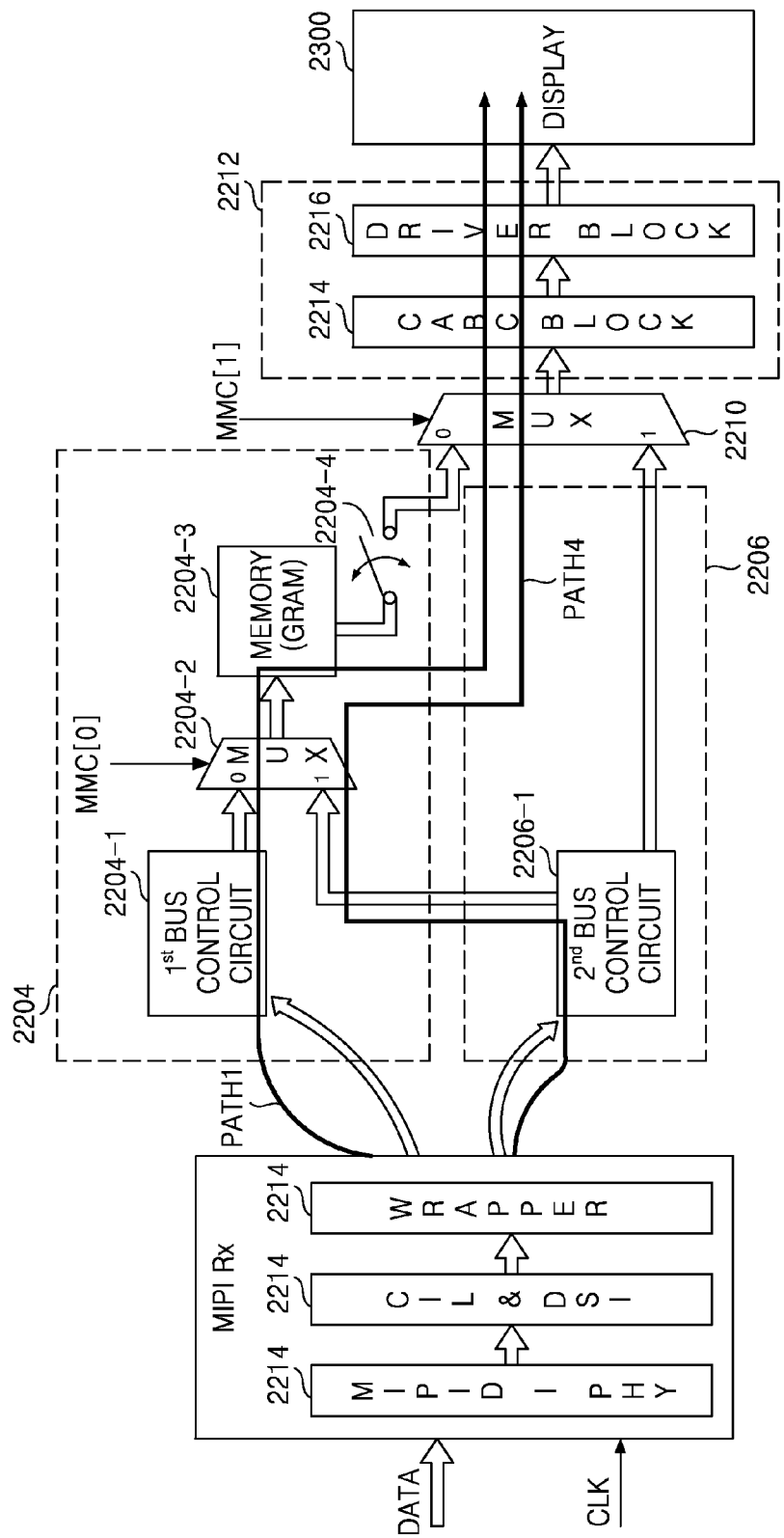
FIG. 28 is a diagram showing image signal paths in different operation modes of the display driver illustrated in FIG. 19 according to further example embodiments of inventive concepts.

In the video mode with memory, the moving image signal MI is transmitted to the display 3000 through a fourth path PATH4 illustrated in FIG. 28.

The memory 2204-3 is included in the first path PATH1, the third path PATH3 and the fourth path PATH4.

The video mode without memory, which is performed when the mode change command MCC[1:0] is "10," is the operation mode in which the moving image signal MI may be transmitted to the display 3000 using the second switching circuit 2206-1 included in a second interface 2206 and bypassing the memory 2204-3.

Figure 20:
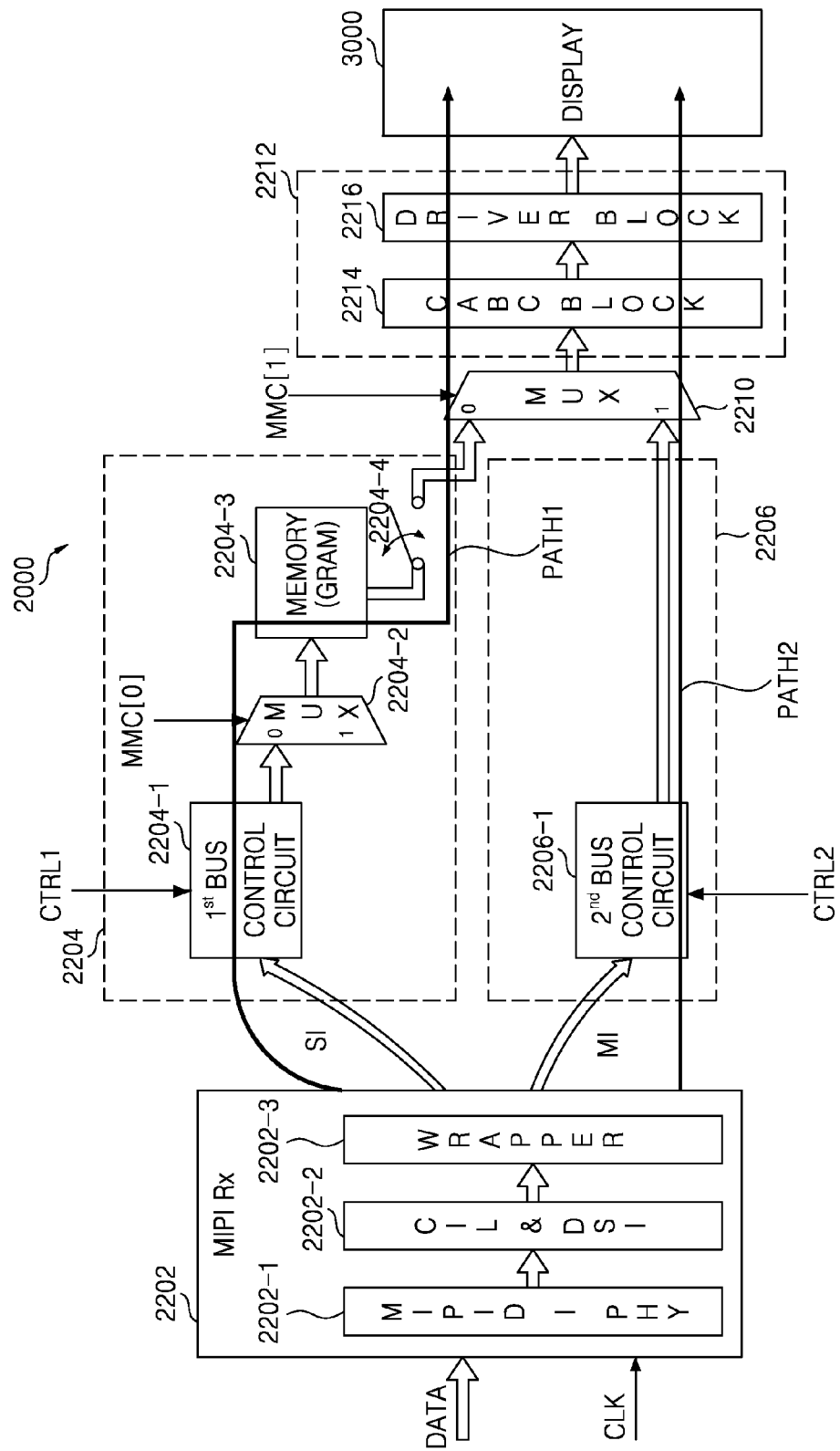
FIG. 20 is a diagram showing image signal paths in different operation modes of the display driver illustrated in FIG. 19.
Figure 25:
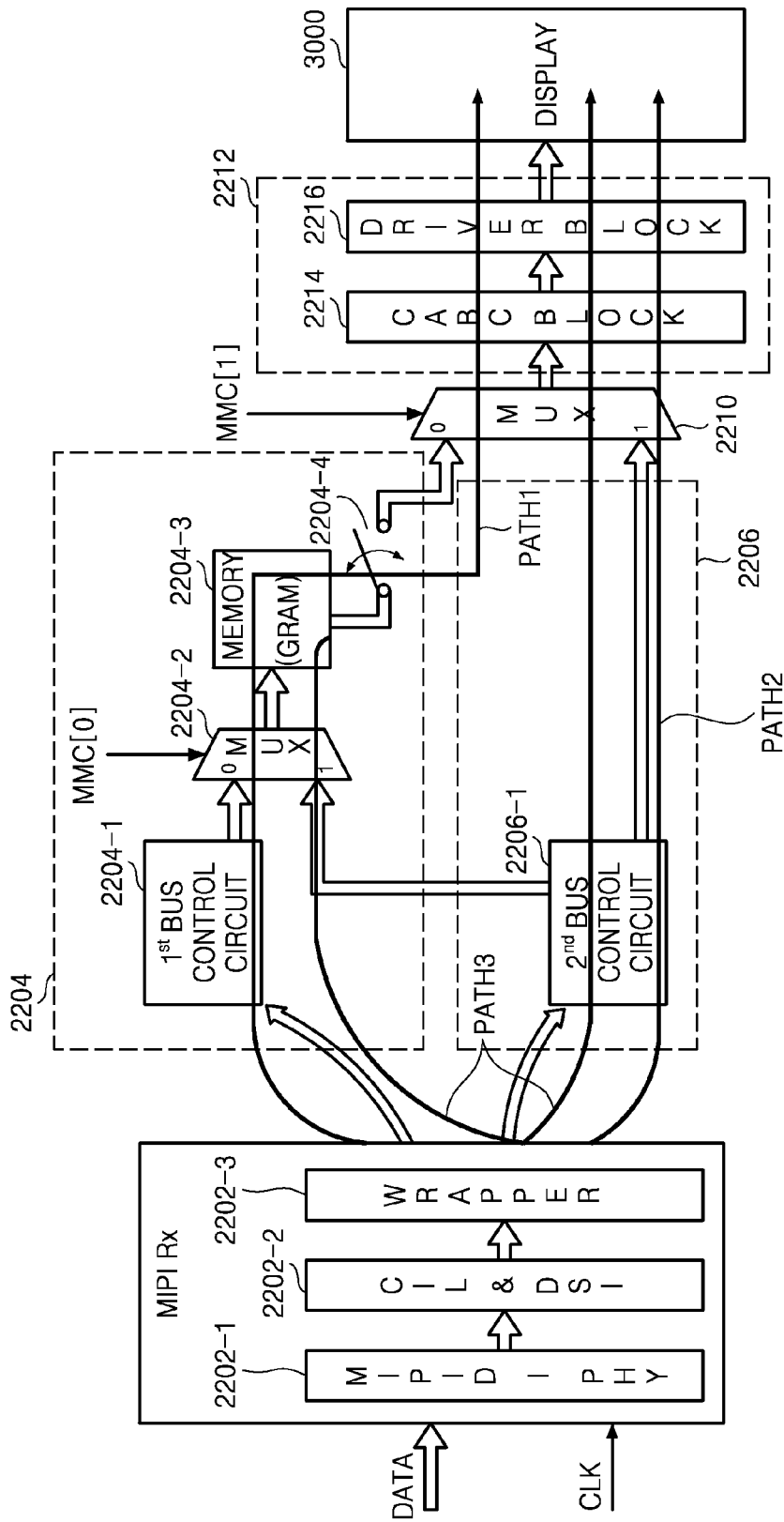
FIG. 25 is a diagram showing image signal paths in different operation modes of the display driver illustrated in FIG. 19 according to other embodiments of inventive concepts.

In the video mode without memory, the moving image signal MI may be transmitted to the display 2300 through a second path PATH2 illustrated in FIG. 20 or 25.

The bridge mode, performed when the mode change command MCC[1:0] is "11," is the operation mode in which the moving image signal MI is transmitted to the display 3000 using the second switching circuit 2206-1 of the second interface 2206 and is simultaneously written to the memory 2204-3 through the elements 2206-1 and 2204-2.

Referring to FIG. 19, the display driver 2000 includes a receiver 2202, the first interface 2204, the second interface 2206, a control circuit 2208, a first selection circuit 2210, an output circuit 2212, and a timing controller 2220. The display driver 2000 may also include an oscillator 2218 and a power circuit 2222.

The receiver 2202 receives the image signal DATA including the mode change command MCC[1:0] which indicates whether the image signal DATA to be displayed on the display 3000 includes the still image signal SI or the moving image signal MI. The image signal DATA is transmitted in synchronization with the clock signal CLK.

The receiver 2202 transmits the mode change command MCC [1:0] included in the image signal DATA to the control circuit 2208.

The receiver 2202 converts the format of the image signal DATA corresponding to the command mode, i.e., the still image signal SI received in series, into a format that can be processed by the first interface 2204 and outputs the still image signal SI with the converted format to the first interface 2204.

The receiver 2202 also converts the format of the image signal DATA corresponding to the video mode, i.e., the moving image signal MI received in series, into a format that can be processed by the second interface 2206 and outputs the moving image signal MI with the converted format to the second interface 2206.

The control circuit 2208 generates first control signals CTRL1 and second control signals CTRL2 in response to the mode change command MCC [1:0] received from the receiver 2202 and transmits the first control signals CTRL1 to the first interface 2204 and the second control signals CTRL2 to the second interface 2206.

In more detail, the control circuit 2208 generates first interface control signals CTRL1, MMC [0], and SWC_OFF for controlling the first interface 2204 in response to the mode change command MCC [1:0] received from the receiver 2202.

For instance, the first interface 2204 may be an interface supporting Mobile Industry Processor Interface (MIPI®) command mode using memory to process still image signals, a CPU interface, or a micro controller unit (MCU) interface, etc. The second interface 2206 may be an interface supporting MIPI® video mode processing moving image signals without using memory or an RGB interface.

In response to the first control signals CTRL1, the first interface 2204 outputs the still image signal SI received from the receiver 2202 using the memory 2204-3.

The first interface 2204 includes the first switching circuit 2204-1, the second selection circuit 2204-2, the memory 2204-3, and the scan switching circuit 2204-4. The first switching circuit 2204-1 controls the transmission of the still image signal SI to the second selection circuit 2204-2 in response to the first control signals CTRL1. The first switching circuit 2204-1 functions as a logic circuit controlling a bus through which still image signals are transmitted.

In response to the second selection signal MMC[0], the second selection circuit 2204-2 selectively transmits either the still image signal SI received from the first switching circuit 2204-1 or the moving image signal MI received from the second switching circuit 2206-1 of the second interface 2206 to the memory 2204-3. For instance, the second selection circuit 2204-2 transmits the still image signal SI received from the first switching circuit 2204-1 to the memory 2204-3 when the second selection signal MMC [0] is logic 0 or low level and transmits the moving image signal MI received from the second switching circuit 206-1 to the memory 2204-3 when the second selection signal MMC [0] is logic 1 or high level.

The memory 2204-3 may be implemented by a graphic memory and stores an image signal transmitted from the second selection circuit 2204-2. Access operations, e.g., a write operation and a read operation, on the memory 2204-3 are controlled by the timing controller 2220.

The still image signal SI or the moving image signal MI stored in the memory 2204-3 according to the mode is transmitted to the display 3000 through the scan switching circuit 2204-4, the first selection circuit 2210, and the output circuit 2212.

The scan switching circuit 2204-4 transmits the still image signal SI or the moving image signal MI stored in the memory 2204-3 to the first selection circuit 2210 in response to the scan switching signal SWC_OFF received from the control circuit 2208.

The second switching circuit 2206-1 of the second interface 2206 outputs the moving image signal MI received from the receiver 2202 to at least one of the first selection circuit 2210 and the second selection circuit 2204-2 of the first interface 2204 in response to the second control signals CTRL2.

The second switching circuit 2206-1 functions as a logic circuit controlling a bus through which moving image signals are transmitted.

The control circuit 2208 generates the first selection signal MMC[1], the scan switching signal SWC_OFF, and a second selection signal MMC[0] in response to the mode change command MCC[1:0] received from the receiver 2202.

The first selection circuit 2210 selectively transmits either the still image signal SI output from an output port, i.e., the scan switching circuit 2204-4, of the first interface 2204 or the moving image signal MI output from an output port of the second interface 2206 to the output circuit 2212 in response to the first selection signal MMC[1]. Each of the selection circuits 2204-2 and 2210 may be implemented by a multiplexer.

For instance, the first selection circuit 2210 transmits an image signal received from the first interface 2204 to the output circuit 2212 when the first selection signal MMC[1] is logic 0 and transmits an image signal received from the second interface 2206 to the output circuit 2212 when the first selection signal MMC[1] is logic 1.

The output circuit 2212 processes an image signal, e.g., the still image signal SI or the moving image signal MI, transmitted from the first selection circuit 2210 and transmits a processed image signal DDATA to the display 3000. The output circuit 2212 may include a brightness control circuit such as a content adaptive brightness control (CABC) block 2214 and a driver block 2216.

The brightness control circuit 2214 eliminates distortion from the image signal by adjusting the brightness of a back light unit and a gamma curve according to the image signal to be displayed on the display 3000 using an algorithm. The operation of the brightness control circuit 2214 may be controlled by a control signal output from the control circuit 2208.

The driver block 2216 transmits an image signal output from the brightness control circuit 2214 to the display 3000.

The driver block 2216 includes a plurality of source drivers (not shown) which may provide a grayscale voltage to a plurality of data lines (or source lines), respectively, according to the image signal. According to example embodiments, the driver block 2216 may include at least one gate driver or a scan driver (not shown). The driver block 2216 is controlled by a control signal output from the timing controller 2220.

The timing controller 2220 controls the operation of the driver block 2216 in response to a control signal from the control circuit 2208. The timing controller 2220 also generates the TE control signal TE in response to the control signal from the control circuit 2208 to mitigate (or alternatively, prevent) tearing or screen tearing and transmits the TE control signal TE to the host 1000.

Figure 24:
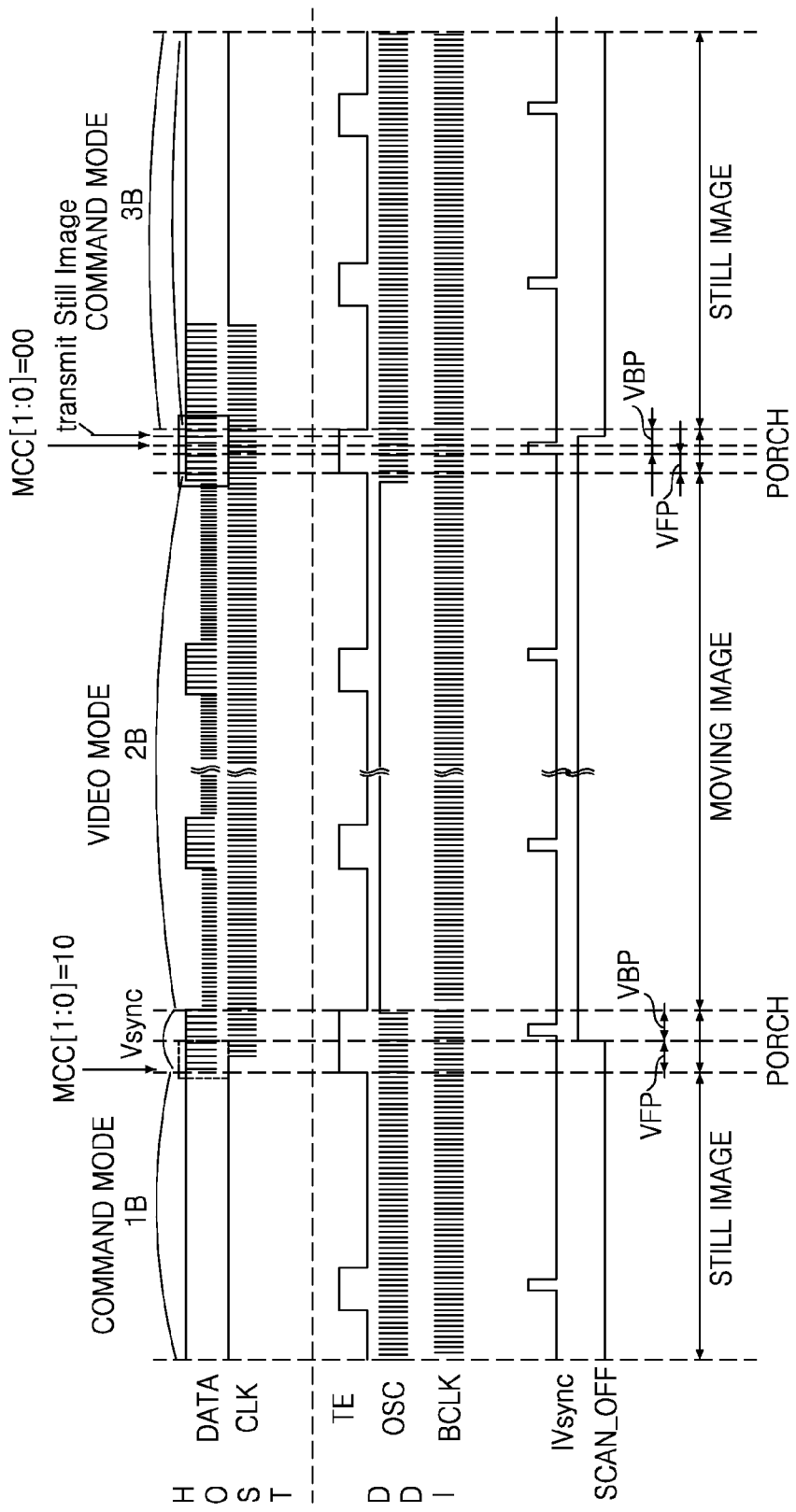
FIG. 24 is a timing chart of the signals of the image signal processing system illustrated in FIG. 15, including the display driver illustrated in FIG. 19 according to other embodiments of inventive concepts.
Figure 27:
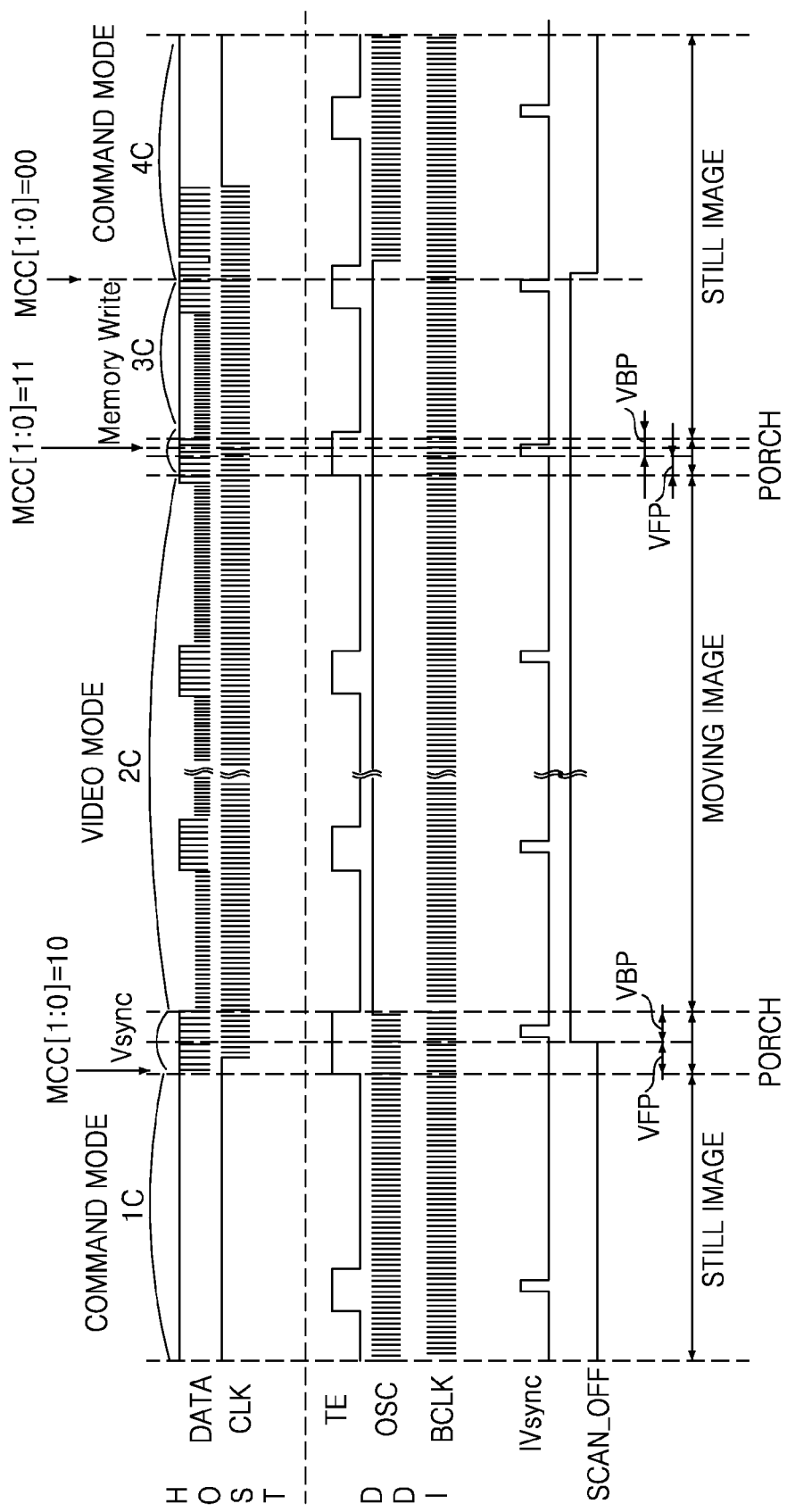
FIG. 27 is a timing chart of the signals of the image signal processing system illustrated in FIG. 15, including the display driver illustrated in FIG. 19 according to further example embodiments of inventive concepts.
Figure 30:
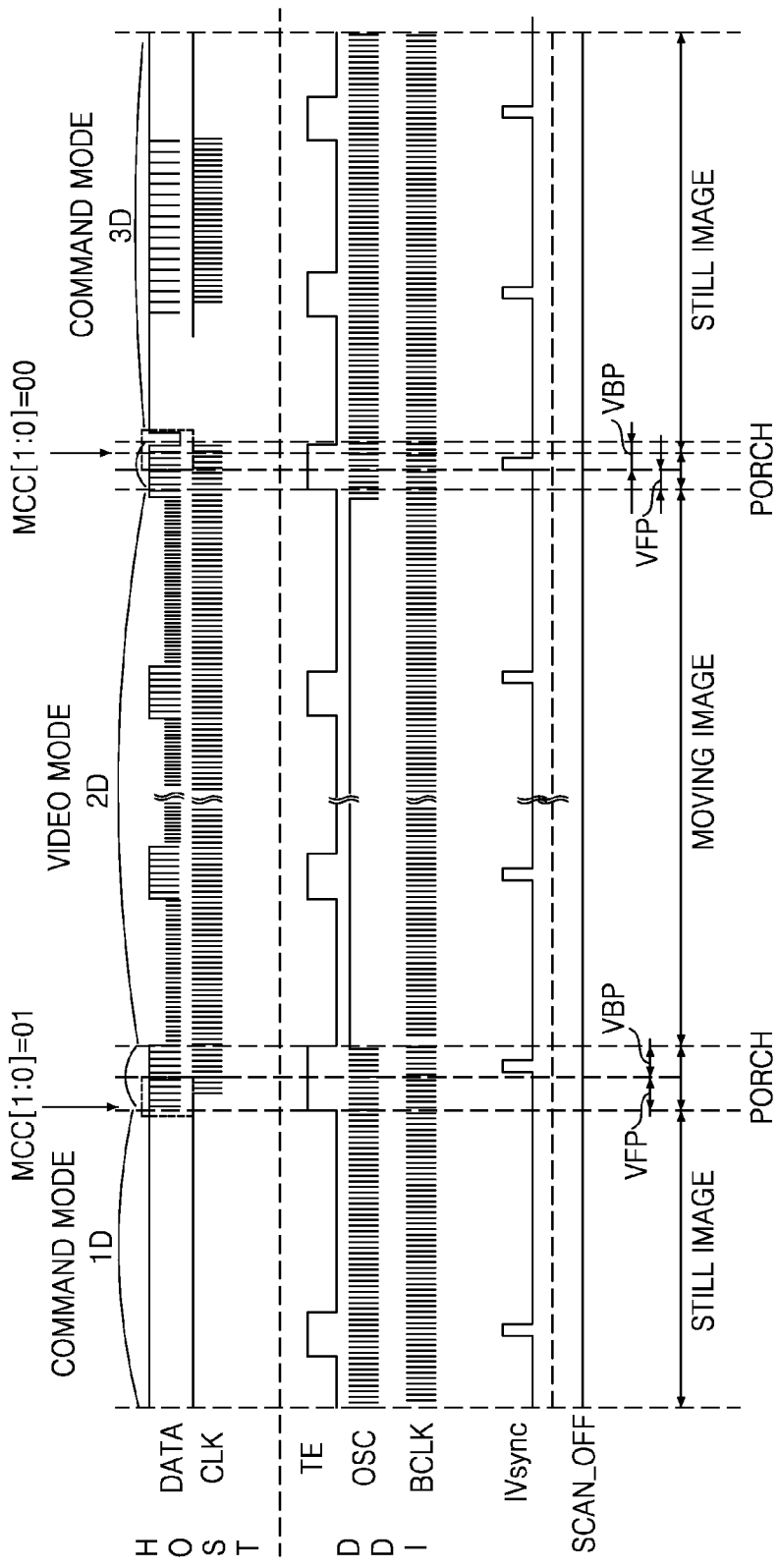
FIG. 30 is a timing chart of the signals of the image signal processing system illustrated in FIG. 15, including the display driver illustrated in FIG. 19 according to other example embodiments of inventive concepts.

The CPU core 1128 of the host 1000 may monitor the TE control signal TE and control the transmission timing of the still image signal SI or the moving image signal MI according to a monitoring result, as illustrated in FIG. 24, 27, or 30, in order to mitigate (or alternatively, prevent) tearing or screen tearing.

The timing controller 2220 also generates a power reference clock signal BCLK in response to the clock signal CLK or an oscillation signal OSC. For instance, the power circuit 2222 boosts the power of the display driver 2000 according to the power reference clock signal BCLK and outputs a boosted power PWR. The timing controller 2220 may also generate an internal vertical synchronization signal IVsync related to the transmission of moving image signals. As illustrated in FIG. 24, 27, or 30, the pulse width of the internal vertical synchronization signal IVsync may be less than that of the TE control signal TE.

The oscillator 2218 generates the oscillation signal OSC according to the control of the control circuit 2208 and transmits the oscillation signal OSC to the timing controller 2220.

Figure 21:
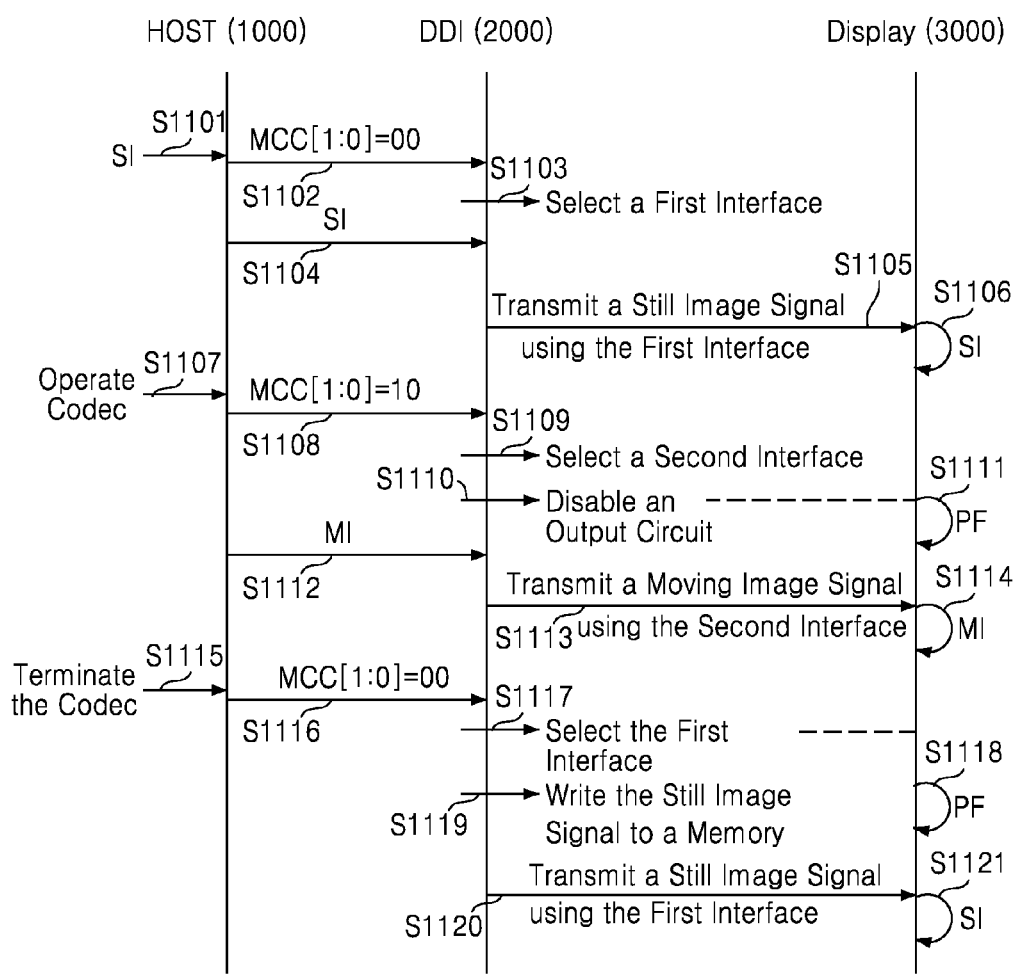
FIG. 21 is a diagram showing data flows in different operation modes of the display driver illustrated in FIG. 19.
Figure 22:
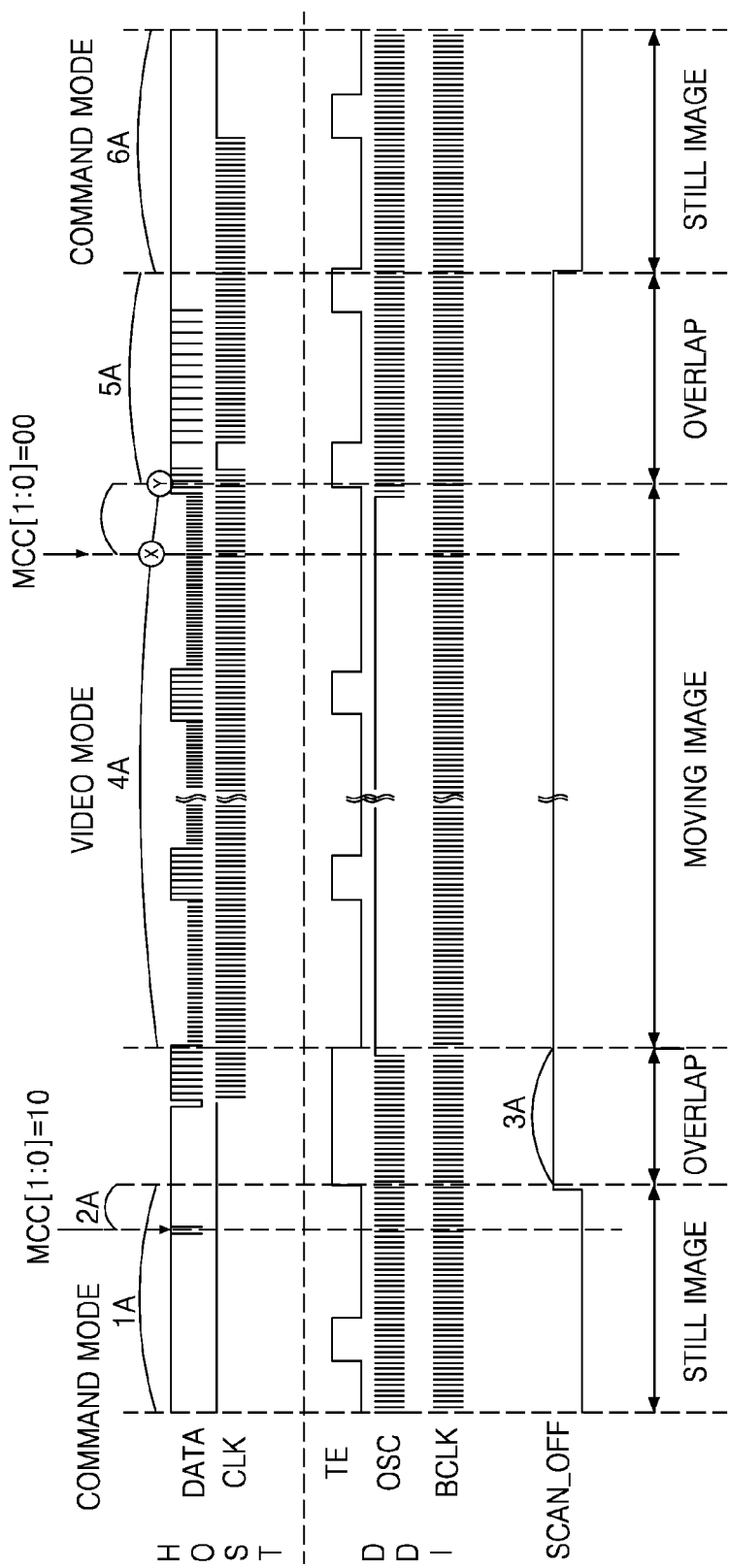
FIG. 22 is a timing chart of the signals of the image signal processing system, illustrated in FIG. 15, including the display driver illustrated in FIG. 19 according to some example embodiments.

FIG. 20 is a diagram showing image signal paths in different operation modes of the display driver 2000 illustrated in FIG. 19. FIG. 21 is a diagram showing data flows in different operation modes of the display driver 2000 illustrated in FIG. 19. FIG. 22 is a timing chart of the signals of the image signal processing system 10C illustrated in FIG. 15, including the display driver 2000 illustrated in FIG. 19.

Referring to FIGS. 19 through 22, the display driver 2000 may process the image signal DATA according to, for example, a MIPI® standard.

Accordingly, the receiver 2202 may include a MIPI D-PHY 2202-1, a control and interface logic (CIL) and display serial interface (DSI) 2202-2, and a wrapper 2202-3 according to the MIPI® standard.

The MIPI D-PHY 2202-1 and the CIL and DSI 2202-2 transmit the image signal DATA output from the host 1000 to the wrapper 2202-3. The wrapper 2202-3 converts the still image signal SI into a signal suitable for the first interface 2204 in the command mode and converts the moving image signal MI into a signal suitable for the second interface 2206 in the video mode.

A procedure for sequentially displaying a still image signal, a moving image signal, and another still image signal on the display 2300 will be described with reference to FIGS. 19 through 22 below.

When the host 1000 intends to transmit a still image signal SI to the display driver 2000 in operation S1101, the CPU core 1128 detects non-operation of the codec 1120 and transmits the mode change command MCC[1:0] (=00) according to a detection result to the display driver 2000 in operation S1102. The receiver 2202 transmits the mode change command MCC[1:0] (=00) to the control circuit 2208.

In response to the mode change command MCC[1:0] (=00) transmitted from the receiver 2202, the control circuit 2208 generates the first control signals CTRL1 for enabling the first switching circuit 2204-1 of the first interface 2204, the second control signals CTRL2 for disabling the second switching circuit 2206-1 of the second interface 2206, the second selection signal MMC[0] (=0) for transmitting an output signal of the first switching circuit 2204-1 to the memory 2204-3, the scan switching signal SWC_OFF for transmitting an output signal of the memory 2204-3 to the first selection circuit 2210, and the first selection signal MMC[1] (=0) for transmitting an output signal of the first interface 2204 to the output circuit 2212 in operation S1103. In other words, the first interface 2204 is selected, so that the first path PATH1 is formed.

After outputting the mode change command MCC[1:0] (=00), the host 1000 outputs the still image signal SI in operation S1104. The still image signal SI (included in the image signal DATA) output from the host 1000 is transmitted to the display 3000 through the first interface 2204 or the first path PATH1 in operation S1105 and is displayed on the display 3000 in operation S1106.

During a command mode, i.e., a period 1A (FIG. 22) defined by the mode change command MCC[1:0] (=00), the still image signal SI is displayed on the display 3000.

In a case where the host 1000 intends to transmit a moving image signal MI to the display driver 2010, the codec 1120 is operated (or executed) in operation S1107. The CPU core 1128 generates the mode change command MCC[1:0] (=10) according to the operation of the codec 1120 and the interface 1126 transmits an image signal DATA including the mode change command MCC[1:0] (=10) to the display driver 2000 in operation S1108.

In response to the mode change command MCC[1:0] (=10) transmitted from the receiver 2202, the control circuit 2208 generates the first control signals CTRL1 for disabling the first switching circuit 2204-1 of the first interface 2204, the second control signals CTRL2 for enabling the second switching circuit 2206-1 of the second interface 2206, the scan switching signal SWC_OFF for transmitting an output signal of the memory 2204-3 to the first selection circuit 2210 during a period 2A, and the first selection signal MMC[1] (=1) for transmitting an output signal of the second interface 2206 to the output circuit 2212 in operation S1109. In other words, the second interface 2206 is selected so that the second path PATH2 is formed.

The scan switching circuit 2204-4 is turned on when the scan switching signal SWC_OFF is at a first level, e.g., a low level, and is turned off when the scan switching signal SWC_OFF is at a second level, e.g., a high level.

A period 3A is a ready period or an overlap interval OVERLAP for switching from the command mode COMMON MODE to the video mode VIDEO MODE. During the period 3A, the output circuit 2212 is disabled according to the control of the timing controller 2220 in operation S1110. Accordingly, the display 3000 holds a frame PF of a still image displayed right before the output circuit 2212 is disabled in operation S1111.

Throughout the periods 1A and 3A, the oscillator 2218 generates the oscillation signal OSC according to the control of the control circuit 2208. The oscillation signal OSC may be the frequency of the frame PF displayed on the display 3000.

For instance, when the display 3000 is implemented by a thin-film transistor (TFT) LCD, a voltage provided to the TFT-LCD is maintained at the polarity of a previous frame in order to mitigate (or alternatively, prevent) flicker from occurring in the TFT-LCD.

After the period 3A elapses, the display driver 2000 is switched from the command mode COMMAND MODE to the video mode VIDEO MODE. In other words, during a period 4A, the host 1000 transmits the moving image signal MI (included in the image signal DATA) to the display driver 2000 in operation S1112. The display driver 2000 transmits the moving image signal MI received from the host 1000 to the display 3000 using the second interface 2206 or the second path PATH2 in operation S1113. The display 3000 displays the moving image signal MI using a dot clock signal in operation S1114. During period 4A, the oscillator 2218 does not generate the oscillation signal OSC according to the control of the control circuit 2208.

In example embodiments where the host 1000 subsequently transmits a still image signal SI after the moving image signal MI to the display 3000, the CPU core 1128 detects the termination of the operation of the codec 1120 in operation S1115 and generates and transmits the mode change command MCC[1:0] (=00) to the register 1124 according to a detection result. The interface 1126 transmits the image signal DATA including the mode change command MCC[1:0] (=00) to the display driver 2000 in operation S0116.

The mode change command MCC[1:0] (=00) may be embedded in the image signal DATA at a time point X or may be embedded in the vertical synchronization signal Vsync (or a vertical blanking interval) at a time point Y when it is transmitted to the display driver 2000.

In response to the mode change command MCC[1:0] (=00) transmitted from the receiver 2202, the control circuit 2208 generates the first control signals CTRL1 for enabling the first switching circuit 2204-1 of the first interface 2204, the second control signals CTRL2 for disabling the second switching circuit 2206-1 of the second interface 2206, the second selection signal MMC[0] (=0) for transmitting an output signal of the first switching circuit 2204-1 to the memory 2204-3, the scan switching signal SWC_OFF for transmitting an output signal of the memory 2204-3 to the first selection circuit 2210, and the first selection signal MMC[1] (=0) for transmitting an output signal of the first interface 2204 to the output circuit 2212 in operation S1117.

In other words, the operation mode of the display driver 2000 is switched from the video mode VIDEO MODE to the command mode COMMAND MODE. The first interface 2204 is selected, so that the first path PATH1 is formed.

Although the operation mode of the display driver 2000 is switched from the video mode VIDEO MODE to the command mode COMMAND MODE, time for writing the still image signal SI received in the command mode COMMAND MODE to the memory 2204-3 is needed since the memory 2204-3 is not accessed in the video mode VIDEO MODE.

Accordingly, during a period 5A, i.e., an overlap interval OVERLAP in FIG. 22, the driver block 2216 of the output circuit 2212 is disabled according to the control of the timing controller 2220. As a result, the display 3000 holds a moving image frame PF displayed right before the output circuit 2212 is disabled in operation S1118. During the period 5A, the still image signal SI transmitted through the first switching circuit 2204-1 is written to the memory 2204-3 in operation S1119. In addition, during the period 5A, the scan switching signal SWC_OFF is at the high level, and therefore, the still image signal SI written to the memory 2204-3 is not output.

During a period 6A after the operation mode is switched from the video mode VIDEO MODE to the command mode COMMAND MODE, the still image signal SI written to the memory 2204-3 is transmitted from the memory 2204-3 to the display 3000 through the first path PATH1 in operation S1120. In other words, the display driver 2000 scans the still image signal SI written to the memory 2204-3 and outputs the scanned still image signal SI to the display 3000 such that the still image signal SI is displayed on the display 3000 in operation S1121.

Figure 23:
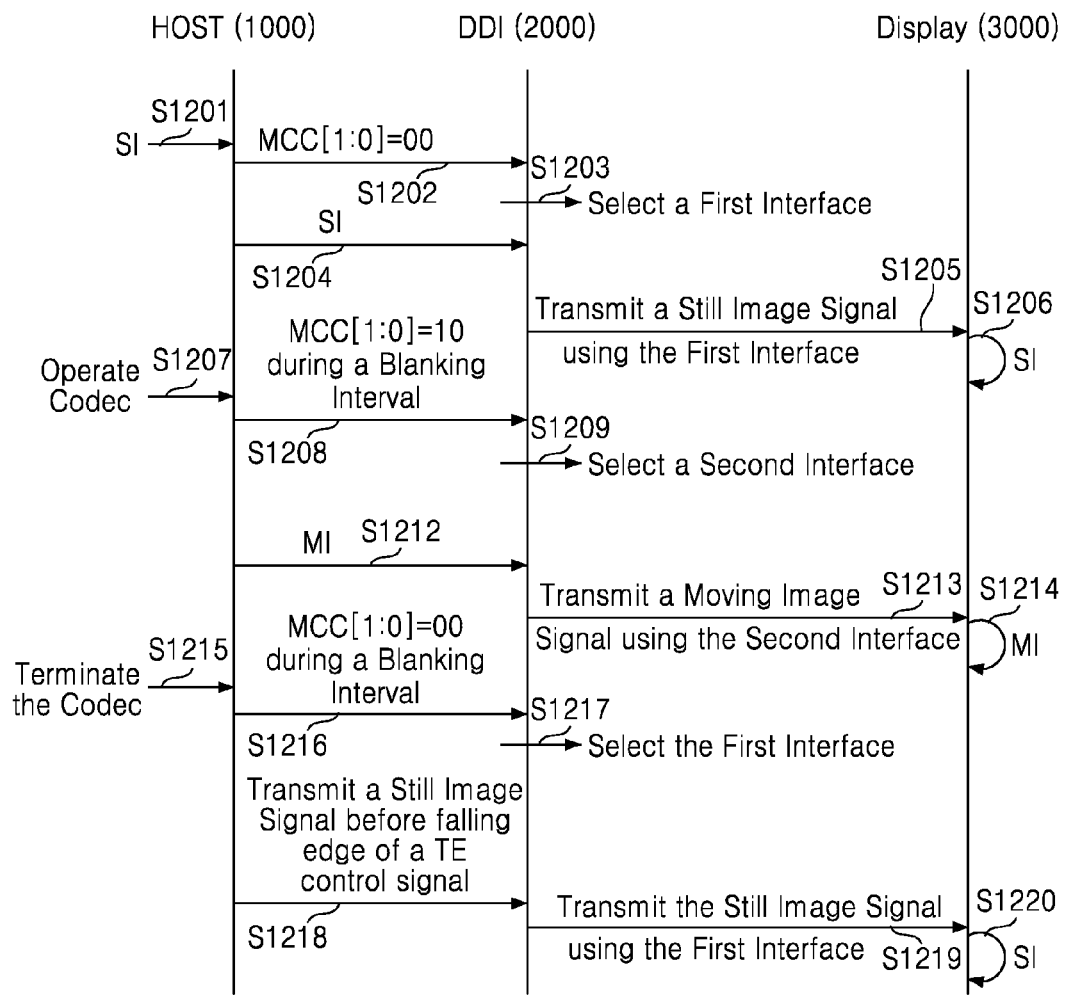
FIG. 23 is a diagram showing data flows in different operation modes of the display driver illustrated in FIG. 19 according to other embodiments of inventive concepts.

FIG. 23 is a diagram showing data flows in different operation modes of the display driver 2000 illustrated in FIG. 19 according to other example embodiments. FIG. 24 is a timing chart of the signals of the image signal processing system 10C illustrated in FIG. 15, including the display driver 2000 illustrated in FIG. 19 according to other example embodiments.

A procedure for sequentially displaying a still image signal, a moving image signal, and another still image signal on the display 3000 will be described with reference to FIGS. 19, 20, 23, and 24 below.

When the host 1000 intends to transmit a still image signal SI to the display driver 2000 in operation S1201, the CPU core 1128 detects non-operation of the codec 1120 and transmits the mode change command MCC[1:0] (=00) according to a detection result to the display driver 2000 in operation S1202.

The receiver 2202 transmits the mode change command MCC[1:0] (=00) to the control circuit 2208.

In response to the mode change command MCC[1:0] (=00) transmitted from the receiver 2202, the control circuit 2208 generates the first control signals CTRL1 for enabling the first switching circuit 2204-1 of the first interface 2204, the second selection signal MMC[0] (=0) for transmitting an output signal of the first switching circuit 2204-1 to the memory 2204-3, the scan switching signal SWC_OFF for transmitting an output signal of the memory 2204-3 to the first selection circuit 2210, and the first selection signal MMC[1] (=0) for transmitting an output signal of the first interface 2204 to the output circuit 2212 in operation S1203. In other words, the first interface 2204 is selected, so that the first path PATH1 is formed.

After outputting the mode change command MCC[1:0] (=00), the host 1000 outputs the still image signal SI in operation S1204. The still image signal SI (included in the image signal DATA) output from the host 1000 is transmitted to the display 3000 through the first interface 2204 or the first path PATH1 in operation S1205 and is displayed on the display 3000 in operation S1206.

During a command mode, i.e., a period 1B (FIG. 24) defined by the mode change command MCC[1:0] (=00), the still image signal SI is displayed on the display 3000.

In example embodiments where the host 1000 intends to transmit a moving image signal MI to the display driver 2000, the codec 1120 is executed in operation S1207. The CPU core 1128 generates the mode change command MCC[1:0] (=10) according to the operation of the codec 1120 and the interface 1126 transmits an image signal DATA including the mode change command MCC[1:0] (=10) to the display driver 2000 in operation S1208.

At this time, in order to reduce (or alternatively, prevent) abnormal display from occurring in the display 3000, the CPU core 1128 monitors the TE control signal TE and transmits the mode change command MCC[1:0] (=10) to the display driver 2000 during a vertical blanking interval of the vertical synchronization signal Vsync, e.g., during a vertical front porch VFP, in operation S1208.

In response to the mode change command MCC[1:0] (=10) transmitted from the receiver 2202, the control circuit 2208 generates the second control signals CTRL2 for enabling the second switching circuit 2206-1 of the second interface 2206, the scan switching signal SWC_OFF at the high level in order to block an output signal of the memory 2204-3 from being output to the first selection circuit 2210 according to the timing shown in FIG. 24, and the first selection signal MMC[1] (=1) for transmitting an output signal of the second interface 2206 to the output circuit 2212 in operation S1209.

At this time, the second selection signal MMC[1] may be 0.

In other words, the second interface 2206 is selected, so that the second path PATH2 is formed.

Immediately after transmitting the mode change command MCC[1:0] (=10), the host 1000 transmits a moving image signal MI (or a moving image stream) to the display driver 2000 in operation S1212. The display driver 2000 transmits the moving image signal MI to the display 3000 using the second interface 2206 or the second path PATH2 in operation S1213. The moving image signal MI is displayed on the display 3000 in operation S1214.

Since the operation mode of the display driver 2000 is switched from the command mode to the video mode during the vertical blanking period, the host 1000 and the display driver 2000 operate in the video mode. In addition, during a period 2B, the host 1000 and the display driver 2000 operate in the video mode without memory.

In example embodiments where the host 1000 subsequently transmits a still image signal SI after the moving image signal MI to the display 3000, the CPU core 1128 detects the termination of the operation of the codec 1120 in operation S1215 and generates and transmits the mode change command MCC[1:0] (=00) to the register 1124 according to a detection result. The interface 1126 transmits the image signal DATA including the mode change command MCC[1:0] (=00) to the display driver 2000 in operation S1216.

At this time, in order to reduce (or alternatively, prevent) abnormal display from occurring in the display 3000, the CPU core 1128 monitors the TE control signal TE and transmits the mode change command MCC[1:0] (=00) to the display driver 2000 during a vertical blanking interval of the vertical synchronization signal Vsync, e.g., during a vertical back porch VBP, in operation S1216. Here, a porch PORCH includes a vertical front porch VFP and a vertical back porch VBF.

In response to the mode change command MCC[1:0] (=00) transmitted from the receiver 2202, the control circuit 2208 generates the first control signals CTRL1 for enabling the first switching circuit 2204-1 of the first interface 2204, the second selection signal MMC[0] (=0) for transmitting an output signal of the first switching circuit 2204-1 to the memory 2204-3, the scan switching signal SWC_OFF at the low level to transmit an output signal of the memory 2204-3 to the first selection circuit 2210, and the first selection signal MMC[1] (=0) for transmitting an output signal of the first interface 2204 to the output circuit 2212 in operation S1217. In other words, the operation mode of the display driver 2000 is switched from the video mode to the command mode. Since the first interface 2204 is selected, the first path PATH1 is selected in operation S1217.

After transmitting the mode change command MCC[1:0] (=00), the host 1000 may transmit a first still image signal SI, e.g., a first still image frame, before a falling edge of the TE control signal TE in operation S1218.

This is because writing to the memory 2204-3 needs to be performed prior to a scan of the memory 2204-3, which may reduce (or alternatively, prevent) the possibility of a dummy image signal being output from the memory 2204-3 when the video mode is switched to the command mode. Here, the scan is an operation of reading an image signal from the memory 2204-3 and transmitting it to the display 3000.

Whenever the still image signal SI is updated, the still image signal SI is written to the memory 2204-3. Accordingly, the display driver 2000 transmits the still image signal SI to the display 3000 through the first interface 2204 or the first path PATH1 in operation S1219. The still image signal SI is displayed on the display 3000 in operation S1220.

Figure 26:
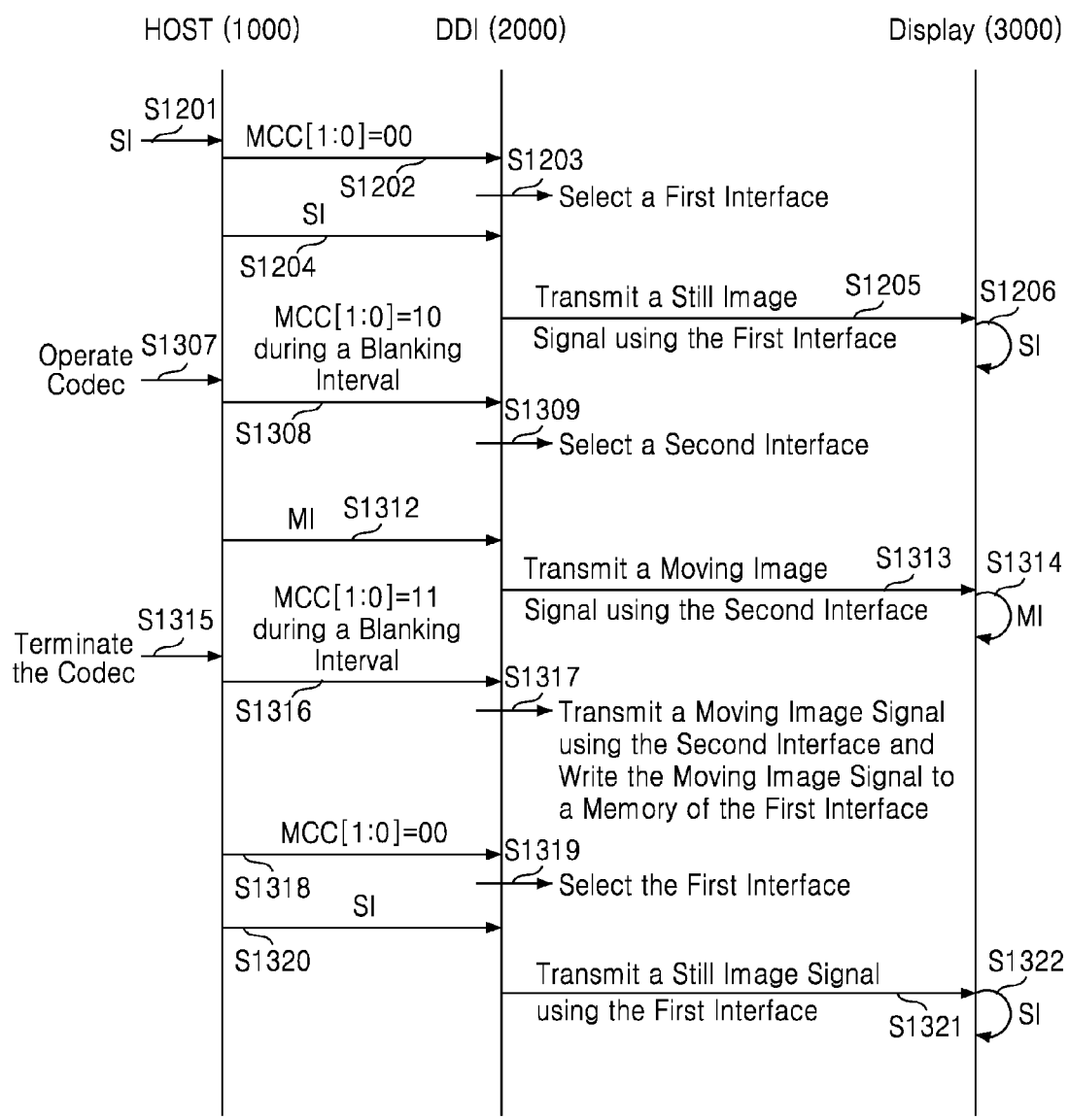
FIG. 26 is a diagram showing data flows in different operation modes of the display driver illustrated in FIG. 19 according to further example embodiments of inventive concepts.

FIG. 25 is a diagram showing image signal paths in different operation modes of the display driver 2000 illustrated in FIG. 19 according to example embodiments. FIG. 26 is a diagram showing data flows in different operation modes of the display driver 2000 illustrated in FIG. 19 also according to example embodiments. FIG. 27 is a timing chart of the signals of the image signal processing system 10C illustrated in FIG. 15, including the display driver 2000 illustrated in FIG. 19 also according to example embodiments.

A procedure for sequentially displaying a still image signal, a moving image signal, and another still image signal on the display 300 will be described with reference to FIGS. 19, 25, 26, and 27 below.

Operations S1201 through S1206 illustrated in FIG. 26 are substantially the same as operations S1201 through S1206 illustrated in FIG. 23. In example embodiments where the host 1000 intends to transmit a moving image signal MI to the display driver 2000 after a still image signal SI is displayed on the display 3000, the codec 1120 is operated in operation S1307. The CPU core 1128 generates the mode change command MCC[1:0] (=10) according to the operation of the codec 1120 and the interface 1126 transmits an image signal DATA including the mode change command MCC[1:0] (=10) stored in the register 1124 to the display driver 2000 in operation S1308.

At this time, in order to reduce (or alternatively, prevent) abnormal display from occurring in the display 3000, the CPU core 1128 monitors the TE control signal TE and transmits the mode change command MCC[1:0] (=10) to the display driver 2000 during a vertical blanking interval of the vertical synchronization signal Vsync, e.g., during a vertical front porch VFP, in operation S1308.

In response to the mode change command MCC[1:0] (=10) transmitted from the receiver 2202, the control circuit 2208 generates the second control signals CTRL2 for enabling the second switching circuit 2206-1 of the second interface 2206, the scan switching signal SWC_OFF at the high level in order to block an output signal of the memory 2204-3 from being output to the first selection circuit 2210 according to the timing shown in FIG. 27, and the first selection signal MMC[1] (=1) for transmitting an output signal of the second interface 2206 to the output circuit 2212 in operation S1309. In other words, the second interface 2206 is selected such that the second path PATH2 is formed.

Immediately after transmitting the mode change command MCC[1:0] (=10), the host 1000 transmits a moving image signal MI (or a moving image stream) to the display driver 2000 in operation S1312. The display driver 2000 transmits the moving image signal MI to the display 3000 using the second interface 2206 or the second path PATH2 in operation S1313. The moving image signal MI is displayed on the display 3000 in operation S1314.

In example embodiments where the host 100 subsequently transmits a still image signal SI after the moving image signal MI to the display 3000, the CPU core 1128 detects the termination of the operation of the codec 1120 in operation S1315 and generates and transmits the mode change command MCC[1:0] (=11) to the register 1124 according to a detection result. The interface 1126 transmits the image signal DATA including the mode change command MCC[1:0] (=11) to the display driver 2000 in operation S1316.

At this time, in order to reduce (or alternatively, prevent) abnormal display from occurring in the display 3000, the CPU core 1128 monitors the TE control signal TE and transmits the mode change command MCC[1:0] (=11) to the display driver 2000 during a vertical blanking interval of the vertical synchronization signal Vsync, e.g., during a vertical back porch VBP, in operation S1316.

In response to the mode change command MCC[1:0] (=11) transmitted from the receiver 2202, the control circuit 2208 generates the second control signals CTRL2, the second selection signal MMC[0] (=1), the scan switching signal SWC_OFF at the high level, and the first selection signal MMC[1] (=1).

The second switching circuit 2206-1 transmits the moving image signal MI to the first selection circuit 2210 and to the second selection circuit 2204-2 in response to the second control signals CTRL2 in the bridge mode. The second selection circuit 2204-2 transmits the moving image signal MI to the memory 2204-3 in response to the second selection signal MMC[0] (=1). Accordingly, the third path PATH3 is formed in the bridge mode. In other words, in the bridge mode corresponding to the mode change command MCC[1:0] (=11), the display driver 2000 transmits the moving image signal MI to the first selection circuit 2210 using the second interface 2206 and also writes the moving image signal MI to the memory 2204-3 through the second selection circuit 2204-2 in operation S1317.

As illustrated in FIG. 27, the scan switching circuit 2204-4 is in an off state in response to the scan switching signal SWC_OFF at the high level during a period 3C.

In response to the first selection signal MMC[1] (=1), the first selection circuit 2210 transmits the moving image signal MI received from the second switching circuit 2206-1 to the output circuit 2212.

After the period 3C elapses, the host 1000 transmits the mode change command MCC[1:0] (=00) to the display driver 2000 during a vertical blanking interval of the vertical synchronization signal Vsync, e.g., during a vertical front porch VFP, in operation S1318.

The first interface 2204 or the first path PATH1 is selected in response to the mode change command MCC[1:0] (=00) in operation S1319. The host 1000 transmits a still image signal SI to the display driver 2000 in operation S1320. The display driver 2000 transmits the still image signal SI to the display 3000 using the memory 2204-3 included in the first interface 2204 in operation S1321. The still image signal SI is displayed on the display 3000 in operation S1322.

Figure 29:
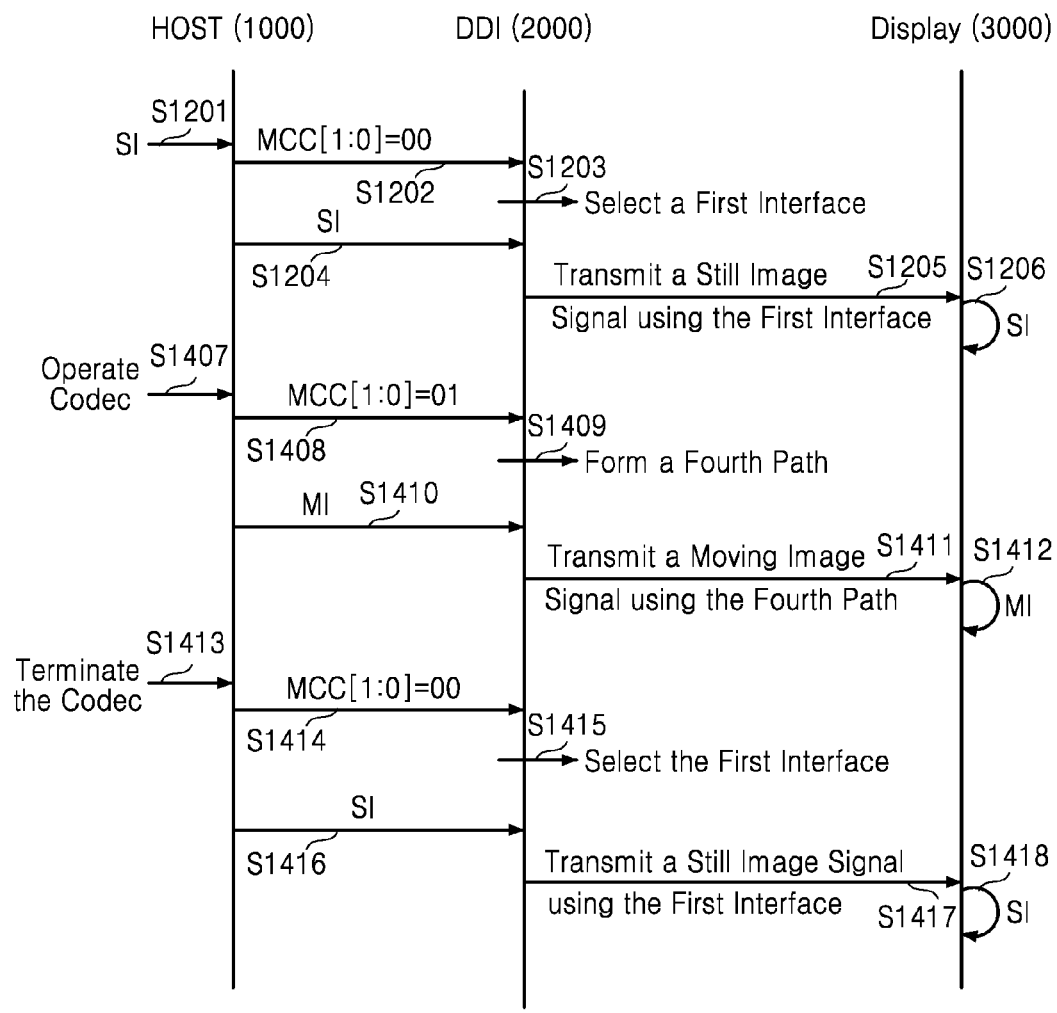
FIG. 29 is a diagram showing data flows in different operation modes of the display driver illustrated in FIG. 19 according to other example embodiments of inventive concepts.

FIG. 28 is a diagram showing image signal paths in different operation modes of the display driver 2000 illustrated in FIG. 19 according to example embodiments. FIG. 29 is a diagram showing data flows in different operation modes of the display driver 2000 illustrated in FIG. 19 according to example embodiments. FIG. 30 is a timing chart of the signals of the image signal processing system 10C illustrated in FIG. 15, including the display driver 2000 illustrated in FIG. 19 according to example embodiments.

A procedure for sequentially displaying a still image signal, a moving image signal, and another still image signal on the display 3000 will be described with reference to FIGS. 19, 25, 26, and 27 below. Operations S1201 through S1206 illustrated in FIG. 29 are substantially the same as operations S1201 through S1206 illustrated in FIG. 23.

In example embodiments where the host 1000 intends to transmit a moving image signal MI to the display driver 2000 after a still image signal SI is displayed on the display 3000, the codec 1120 is operated in operation S1407. The CPU core 1128 generates the mode change command MCC[1:0] (=01) according to the operation of the codec 1120 and the interface 1126 transmits an image signal DATA including the mode change command MCC[1:0] (=01) to the display driver 2000 in operation S1408.

At this time, in order to reduce (or alternatively, prevent) abnormal display from occurring in the display 3000, the CPU core 1128 monitors the TE control signal TE and transmits the mode change command MCC[1:0] (=01) to the display driver 2000 during a vertical blanking interval of the vertical synchronization signal Vsync, e.g., during a vertical front porch VFP, in operation S1408.

The control circuit 2208 generates the second control signals CTRL2, the second selection signal MMC[0] (=1), the scan switching signal SWC_OFF at the low level, and the first selection signal MMC[1] (=0) in operation S1409 to form the fourth path PATH4.

Immediately after transmitting the mode change command MCC[1:0] (=01) to the display driver 2000, the host 1000 transmits the moving image signal MI to the display driver 2000 in operation S1410. The display driver 2000 transmits the moving image signal MI to the display 3000 through the fourth path PATH4 in operation S1411. The moving image signal MI is displayed on the display 3000 in operation S1412.

In example embodiments where the host 1000 subsequently transmits a still image signal SI after the moving image signal MI to the display 3000, the CPU core 1128 detects the termination of the operation of the codec 1120 in operation S1413 and generates and transmits the mode change command MCC[1:0] (=00) to the register 1124 according to a detection result. The interface 1126 transmits the image signal DATA including the mode change command MCC[1:0] (=00) to the display driver 2000 in operation S1414.

At this time, in order to reduce (or alternatively, prevent) abnormal display from occurring in the display 3000, the CPU core 1128 monitors the TE control signal TE and transmits the mode change command MCC[1:0] (=00) to the display driver 2000 during a vertical blanking interval of the vertical synchronization signal Vsync, e.g., during a vertical back porch VBP, in operation S1414.

In response to the mode change command MCC[1:0] (=00), the display driver 2000 selects the first interface 2204 or the first path PATH1 in operation S1415. The display driver 2000 receives the still image signal SI from the host 1000 in operation S1416 and transmits the still image signal SI to the display 3000 through the first interface 2204 or the first path PATH1 in operation S1417. The still image signal SI is displayed on the display 3000 in operation S1418.

As described above, according to some example embodiments, a display driver determines whether to transmit a still image signal to a display using a memory or transmit a moving image signal to the display without using the memory according to a mode change command indicating whether an image signal to be displayed on the display is the still image signal or the moving image signal, thereby reducing power consumption.

While example embodiments have been particularly shown and described with reference to example embodiments thereof, it will be understood by those of ordinary skill in the art that various changes in forms and details may be made therein without departing from the spirit and scope of example embodiments as defined by the following claims.

What is claimed is:
1. A display driver comprising:
a receiver configured to receive an image signal including a mode change command indicating whether the image signal to be displayed on a display is a still image signal or a moving image signal;

a control circuit configured to generate first control signals and second control signals in response to the mode change command transmitted from the receiver;

a first interface configured to output the still image signal from the receiver using a memory in response to the first control signals; and a second interface configured to output the moving image signal from the receiver without using the memory in response to the second control signals, wherein the mode change command is embedded in a vertical blanking interval included in the still image signal or the moving image signal.

2. The display driver of claim 1, wherein the first interface comprises:

a first switching circuit configured to control transmission of the still image signal in response to the first control signals; and a selection circuit configured to transmit the still image signal received from the first switching circuit or the moving image signal received from the second interface to the memory in response to a selection signal generated by the control circuit based on the mode change command.

3. The display driver of claim 2, wherein the second interface comprises a second switching circuit configured to output the moving image signal transmitted from the receiver to at least one of the selection circuit and an output port of the second interface in response to the second control signals.

4. The display driver of claim 3, wherein the second switching circuit is configured to simultaneously output the moving image signal transmitted from the receiver to the selection circuit and the output port of the second interface for a desired period of time in response to the second control signals.

5. The display driver of claim 1, wherein the first interface is an interface supporting mobile industry processor interface (MIPI®) command mode or a central processing unit (CPU) interface, and the second interface is an interface supporting MIPI® video mode or an RGB interface.

6. The display driver of claim 1, further comprising:

a first selection circuit configured to output the still image signal output from the memory or the moving image signal output from the second interface in response to a first selection signal; and an output circuit configured to transmit an image signal output from the first selection circuit to the display, the control circuit configured to generate the first selection signal in response to the mode change command.

7. The display driver of claim 6, wherein the first interface includes a first switching circuit configured to transmit the still image signal to the memory in response to the first control signals and a scan switching circuit configured to transmit the still image signal from the memory to the first selection circuit in response to a scan switching signal, and the second interface includes a second switching circuit configured to transmit the moving image signal to the first selection circuit in response to the second control signals.

8. The display driver of claim 6, wherein the first interface includes a first switching circuit configured to transmit the still image signal in response to the first control signals, a second selection circuit configured to output the still image signal received from the first switching circuit or the moving image signal received from the second interface to the memory in response to a second selection signal, a scan switching circuit configured to transmit the still image signal from the memory to the first selection circuit in response to a scan switching signal, and the second interface includes a second switching circuit configured to transmit the moving image signal to at least one of the first selection circuit and the second selection circuit in response to the second control signals, the control circuit configured to generate the second selection signal and the scan switching signal in response to the mode change command.

9. The display driver of claim 8, wherein the scan switching circuit is in an on state in response to the scan switching signal while the second switching circuit transmits the moving image signal to the second selection circuit in response to the second control signals, and the scan switching circuit is in an off state in response to the scan switching signal while the second switching circuit transmits the moving image signal to the first selection circuit in response to the second control signals.

10. The display driver of claim 8, wherein if the second switching circuit transmits the moving image signal to both of the first and second selection circuits simultaneously in response to the second control signals, the scan switching circuit is turned off in response to the scan switching signal.

11. A portable communication device comprising:

a display;

a display driver configured to transmit an image signal to the display; and a host configured to transmit the image signal including a mode change command, the mode change command indicating whether the image signal to be displayed on the display is a still image signal or a moving image signal, to the display driver, the display driver including, a control circuit configured to generate first control signals and second control signals in response to the mode change command;

a first interface configured to transmit the still image signal to the display using a memory in response to the first control signals; and a second interface configured to transmit the moving image signal to the display without using the memory in response to the second control signals, wherein the host is configured to transmit the mode change command, which indicates that the moving image signal is transmitted following the still image signal, to the display driver in a vertical blanking interval and then immediately transmit the moving image signal to the display driver.

12. The communication device of claim 11, wherein the display driver further comprises:

a first selection circuit configured to output the image signal output from an output port of the first interface or an output port of the second interface in response to a first selection signal; and an output circuit configured to transmit the image signal output from the first selection circuit to the display, the first interface including, a first switching circuit configured to transmit the still image signal in response to the first control signals;

a second selection circuit configured to output the still image signal received from the first switching circuit or the moving image signal received from the second interface to the memory in response to a second selection signal; and a scan switching circuit configured to transmit the still image signal from the memory to the first selection circuit in response to a scan switching signal, the second interface including,
    a second switching circuit configured to transmit the moving image signal to at least one circuit among the first selection circuit and the second selection circuit in response to the second control signals, the control circuit configured to generate the first selection signal, the second selection signal, and the scan switching signal in response to the mode change command.

13. The communication device of claim 12, wherein if the moving image signal is transmitted following the still image signal or if the still image signal is transmitted following the moving image signal, the output circuit is disabled for a period corresponding to at least one frame according to the control of a timing controller.

14. The communication device of claim 11, wherein the host is configured to determine whether the image signal is the still image signal or the moving image signal based on operation or non-operation of a codec and generate the mode change command according to a determination result.

15. The communication device of claim 14, wherein the host is configured to monitor a tearing effect control signal received from the display driver and transmit the mode change command to the display driver in the vertical blanking interval according to a monitoring result.

16. The communication device of claim 11, wherein the vertical blanking interval is a vertical front porch.

17. The communication device of claim 11, wherein the host is configured to transmit the mode change command, which indicates that the still image signal is transmitted following the moving image signal, to the display driver in the vertical blanking interval and then transmit a first still image frame of the still image signal to the display driver before a first falling edge of a tearing effect control signal.

18. The communication device of claim 17, wherein the vertical blanking interval is a vertical back porch.

19. The communication device of claim 11, wherein the second interface is configured to transmit the moving image signal to both of the display and the memory, simultaneously, in response to the second control signals, and the first interface is configured to transmit the moving image signal from the memory to the display driver in response to a switching signal output from the control circuit.

20. An operation method of a display driver, the method comprising:
    generating control signals in response to a mode change command, the mode change command indicating whether an image signal to be displayed on a display is a still image signal or a moving image signal; and
    switching between a command mode, in which the still image signal is transmitted to the display via a memory, and a video mode, in which the moving image signal is transmitted to the display without using the memory, in response to the control signals, wherein the mode change command is embedded in a vertical blanking interval of the still image signal or the moving image signal.

21. The method of claim 20, further comprising:
not transmitting the image signal to the display during at least one frame of the image signal if switching is performed between the video mode and the command mode.

* * * * *